United States Patent
Dasilva et al.

(10) Patent No.: US 8,661,124 B2
(45) Date of Patent: Feb. 25, 2014

(54) ORGANIZING SOCIAL ACTIVITY INFORMATION ON A SITE

(75) Inventors: Tim Dasilva, Northern Hills, CA (US);
Lynn Shiau, Santa Monica, CA (US);
Philo Juang, Los Angeles, CA (US);
John Fisher, Los Angeles, CA (US);
Gunthar Hartwig, Berkeley, CA (US);
Brian Glick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,832

(22) Filed: Sep. 26, 2011

(65) Prior Publication Data

US 2012/0023534 A1 Jan. 26, 2012

Related U.S. Application Data

(63) Continuation of application No. 13/070,437, filed on Mar. 23, 2011.

(60) Provisional application No. 61/316,828, filed on Mar. 23, 2010.

(51) Int. Cl.
*G06F 15/173* (2006.01)

(52) U.S. Cl.
USPC ........... 709/224; 709/204; 709/206; 709/217; 709/223; 725/109; 725/116

(58) Field of Classification Search
USPC ......... 709/206, 223, 226, 203, 204, 217, 224; 707/754; 725/109, 116
See application file for complete search history.

(56) References Cited

U.S. PATENT DOCUMENTS

| | | | |
|---|---|---|---|
| 7,669,123 B2 | 2/2010 | Zuckerberg et al. | |
| 7,886,000 B1 * | 2/2011 | Polis et al. | 709/217 |
| 2006/0230061 A1 * | 10/2006 | Sample et al. | 707/103 R |
| 2007/0204308 A1 | 8/2007 | Nicholas et al. | |
| 2007/0214141 A1 * | 9/2007 | Sittig et al. | 707/7 |
| 2008/0040673 A1 | 2/2008 | Zuckerberg et al. | |
| 2008/0126476 A1 | 5/2008 | Nicholas et al. | |
| 2008/0222199 A1 * | 9/2008 | Tiu et al. | 707/104.1 |
| 2008/0222295 A1 * | 9/2008 | Robinson et al. | 709/227 |
| 2008/0302867 A1 | 12/2008 | Holberg | |
| 2009/0222488 A1 * | 9/2009 | Boerries et al. | 707/104.1 |
| 2009/0313244 A1 | 12/2009 | Sokolenko et al. | |
| 2010/0122309 A1 * | 5/2010 | Kawakami et al. | 725/116 |

(Continued)

OTHER PUBLICATIONS

International Search Report and Written Opinion, PCT/US2011/029686, May 27, 2011, 8 pages.

(Continued)

*Primary Examiner* — Ramy M Osman
(74) *Attorney, Agent, or Firm* — Lowenstein Sandler LLP

(57) ABSTRACT

A system and method for organizing social activity information on a website is disclosed. The system comprises a feed serving module and a presentation module. The feed serving module is configured to receive one or more user inputs for one or more activities associated with the social activity information. The feed serving module aggregates the social activity information based at least in part on the one or more user inputs to form aggregated social activity information. The presentation module is communicatively coupled to the feed serving module and is configured to receive the aggregated social activity information from the feed serving module. The presentation module generates a graphic associated with the aggregated social activity information and sends the graphic to a client.

21 Claims, 30 Drawing Sheets

(56) References Cited

U.S. PATENT DOCUMENTS

| | | | |
|---|---|---|---|
| 2010/0162375 A1* | 6/2010 | Tiu et al. | 709/203 |
| 2010/0179915 A1* | 7/2010 | Nastacio | 705/319 |
| 2010/0287592 A1* | 11/2010 | Patten et al. | 725/59 |
| 2010/0293105 A1 | 11/2010 | Blinn et al. | |
| 2011/0004831 A1 | 1/2011 | Steinberg et al. | |
| 2011/0030022 A1* | 2/2011 | Todd et al. | 725/109 |
| 2011/0106718 A1* | 5/2011 | Roberts et al. | 709/206 |
| 2011/0113332 A1* | 5/2011 | Roberts et al. | 715/716 |
| 2011/0202544 A1* | 8/2011 | Carle et al. | 707/754 |
| 2011/0214086 A1 | 9/2011 | Narayanan et al. | |
| 2011/0264737 A1* | 10/2011 | Skinner | 709/204 |

OTHER PUBLICATIONS

P2P File Sharing, Internet, retrieved at, http://www.p2p-weblog.com/50226711/altnet_launches_global_file_registry.php, 4 pages.

Altnet, Internet, retrieved at, http://www.globalfileregistry.com/assets/Global_File_Registry_White_Paper.pdf, May 26, 2006, 20 pages.

* cited by examiner

300

500

700

905

1405

1905

2305

2405

2505

ORGANIZING SOCIAL ACTIVITY INFORMATION ON A SITE

CROSS REFERENCE

This application is a continuation of U.S. application Ser. No. 13/070,437 filed Mar. 23, 2011 and entitled "ORGANIZING SOCIAL ACTIVITY INFORMATION ON A SITE," which claims priority under 35 USC §119(e) to U.S. application Ser. No. 61/316,828, filed on Mar. 23, 2010 and entitled "SOCIAL FEED FOR VIDEO SITE," the entirety of each of which is herein incorporated by reference.

FIELD OF THE INVENTION

The present invention relates to a system and method for providing videos over a network. In particular, the present invention relates to organizing social activity information on a site.

BACKGROUND

The sharing of video content on websites has developed into a worldwide phenomenon, supported by hundreds of thousands of websites. Video hosting sites, such as YOUTUBE™, currently have millions of users and tens of millions of videos. A user of a video hosting site may be interested in his/her friends' activities (e.g., viewing a video, uploading a video, etc.) so that he/she can determine videos to view based at least in part on his/her friends' activities. Existing systems that recommend videos to a user based off the activities of friends have numerous problems.

A first problem present in existing solutions is that they do not present the activities of the friends in an organized and useful way. For example, if the user has 200 friends and each friend views 5 videos in a day (for a total of 1,000 videos viewed by the user's friends), it is difficult to present the 1,000 activities to the user in a meaningful way. This problem is further frustrated by the limited display space of the video hosting site.

A second problem present in existing solutions is that they only rely on friends' activities on a single video hosting site when recommending a video to a user. If a user's friends are viewing videos on multiple websites, then the user is missing out on viewing many of the same videos as the user's friends.

SUMMARY OF THE INVENTION

The present invention overcomes the deficiencies and limitations of the prior art at least in part by providing a system and method for organizing social activity information on a site. In one embodiment, the system comprises a feed serving module and a presentation module. A system and method for providing a user feed on a website is disclosed. The system comprises a feed serving module and a presentation module. The feed serving module is configured to receive one or more user inputs for one or more activities associated with the social activity information. The feed serving module aggregates the social activity information based at least in part on the one or more user inputs to form aggregated social activity information. The presentation module is communicatively coupled to the feed serving module and is configured to receive the aggregated social activity information from the feed serving module. The presentation module generates a graphic associated with the aggregated social activity information and sends the graphic to a client.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
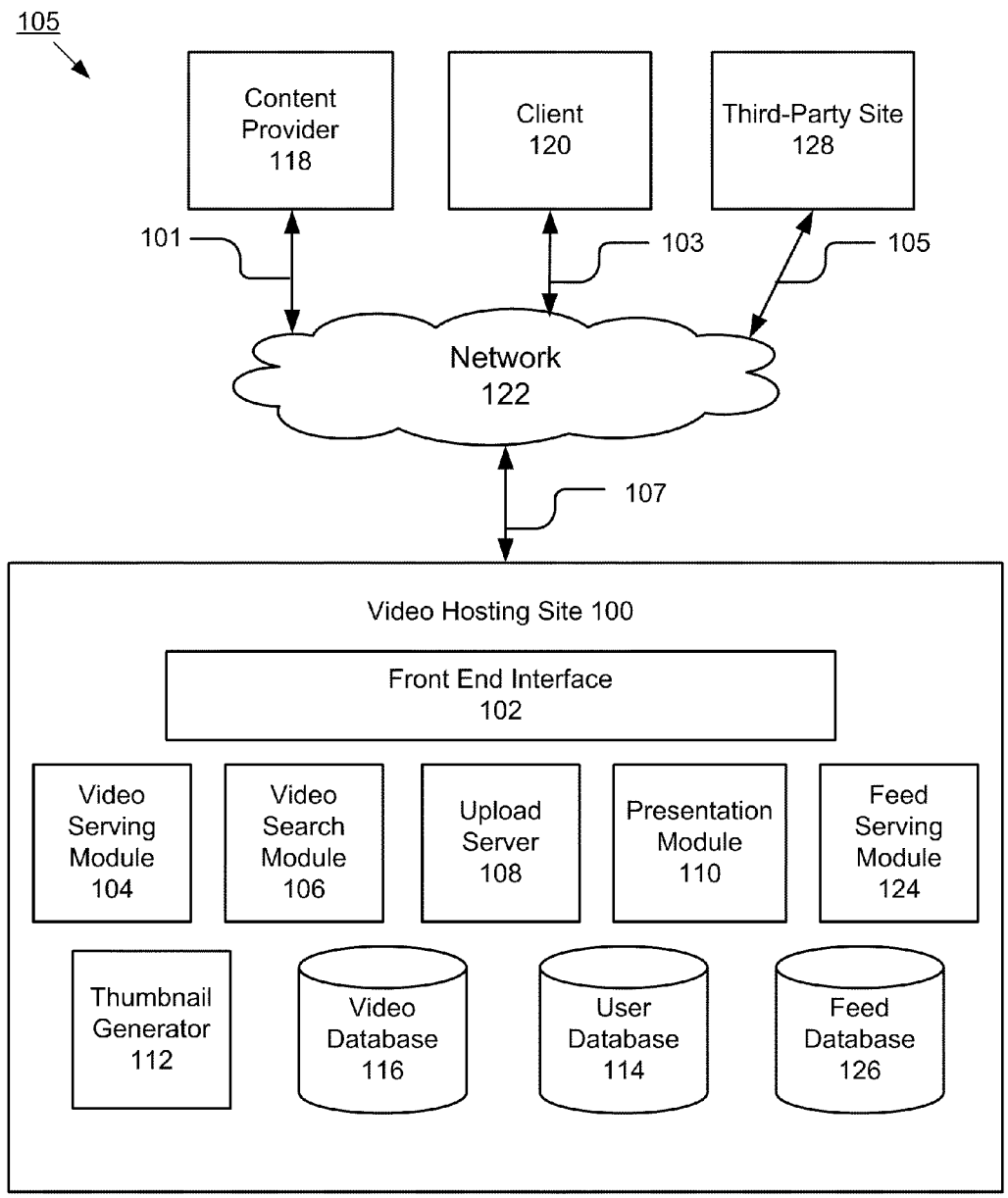
FIG. 1 is a high-level block diagram illustrating a system for organizing social activity information on a website according to one embodiment.

A system and method for organizing social activity information on a website is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 is a high-level block diagram illustrating a system 105 for organizing social activity information on a website according to one embodiment. Examples of the website include, but are not limited to: a video hosting site; an online bulletin board; a social networking site; and a video hosting site integrated with social networking features. The illustrated embodiment of the system 105 includes: a video hosting site 100; a content provider 118; a client 120; and a third-party site 128. The video hosting site 100, the content provider 118, the client 120 and the third-party site 128 are communicatively coupled via a network 122. For example, the video hosting site 100, the content provider 118, the third-party site 128 and the client 120 are communicatively coupled via a network 122 to facilitate sharing of information (e.g., video content) between users of client devices similar to the client 120. Although only one content provider 118, one client 120 and one third-party site 128 are illustrated, persons having ordinary skill in the art will recognize that any number of content providers 118, clients 120 and third-parity sites 128 can be communicatively coupled to the network 122. Furthermore, while only one network 122 is coupled to the third-parity site 128, the client 120, the content provider 118 and the video hosting site 100, persons having ordinary skill in the art will appreciate that any number of networks 122 can be connected to the third-party site 128, the client 120, the content provider 118 and the video hosting site 100.

The network 122 is a conventional type of network, wired or wireless, and may have any number of configurations such as a star configuration, token ring configuration or other configurations known to those skilled in the art. In one embodiment, the network 122 comprises one or more of a local area network (LAN), a wide area network (WAN) (e.g., the Internet), and/or any other interconnected data path across which multiple devices communicate. In another embodiment, the network 122 is a peer-to-peer network. In one embodiment, the network 122 is coupled to or includes portions of a telecommunications network for sending data in a variety of different communication protocols. For example, the network is a 3G network or a 4G network. In yet another embodiment, the network 122 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 122 are encrypted using conventional encryption technologies such as secure sockets layer (SSL), secure HTTP and/or virtual private networks (VPNs).

In the illustrated embodiment, the network 122 is communicatively coupled to the video hosting site 100 via signal line 107. The network 122 is communicatively coupled to the content provider 118 via signal line 101. The network 122 is communicatively coupled to the client 120 via signal line 103. The network 122 is communicatively coupled to the third-parity site 128 via signal line 105.

The third-party site 128 is any website accessible by a user of a client device such as the client 120. For example, the third-party site 128 is a social networking site, a third-party video hosting site, a video hosting site integrated with social networking features, an online bulletin board, etc. In one embodiment, the third-party site 128 is an optional feature of the system 105.

The video hosting site 100 is any system that allows users to access video content via searching and/or browsing interfaces. An example of a video hosting site 100 is the YOUTUBE™ website, found at www.youtube.com. Other video hosting sites are known as well, and are adapted to operate according to the teachings disclosed herein. It will be understood that the term "website" represents any computer system adapted to serve content using any internet working protocols, and is not intended to be limited to content uploaded or downloaded via the Internet or the HTTP protocol.

In one embodiment, sources of the video content on the video hosting site 100 are from uploads of videos by users, searches or crawls of other websites or databases of videos, or the like, or any combination thereof. For example, in one embodiment, a video hosting site 100 is configured to allow upload of video content by users. In another embodiment, a video hosting site 100 is configured to obtain videos from other sources by crawling such sources or searching such sources in real time.

To simplify and clarify the present description, the video content received and shared by the video hosting site 100 will be referred to as videos, video files, or video items. Persons having ordinary skill in the art will recognize that the video hosting site 100 can receive and share content of any media type and file type. For example, the video hosting site 100 shares content such as a video, an audio, a combination of video and audio, an image such as a JPEG or GIF file and/or a text file, etc.

The video hosting site 100 is communicatively coupled to the network 122. In the illustrated embodiment, the video hosting site 100 includes: a front end interface 102; a video serving module 104; a video search module 106; an upload server 108; a presentation module 110; a thumbnail generator 112; a user database 114; a video database 116; a feed serving module 124; and a feed database 126. The components of the video hosting site 100 are communicatively coupled to one another. Other conventional features, such as firewalls, load balancers, authentication servers, application servers, failover servers, site management tools, and so forth are not shown so as not to obscure the feature of the system. In one embodiment, the illustrated components of the video hosting website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the video hosting website 100 are performed by one or more clients 120 or content providers 118 in other embodiments if appropriate. In one embodiment, the functionality attributed to a particular component is performed by different or multiple components operating together.

Each of the various servers and modules on the video hosting site 100 is implemented as a server program executing on a server-class computer comprising one or more central processing units ("CPU," or "CPUs" if plural), memory, network interface, peripheral interfaces, and other well-known components. In one embodiment, the computers themselves run an open-source operating system such as LINUX, have one or more CPUs, 1 gigabyte or more of memory, and 100 gigabytes or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in one or more tangible, non-transitory computer-readable storage mediums (e.g., random access memory ("RAM"), flash, solid-state drive ("SSD"), hard disk drive, optical/magnetic media, etc.).

The front end interface 102 is an interface that handles communication with the content provider 118 and/or the client 120 via the network 122. For example, the front end interface 102 receives video files uploaded from the content provider 118 and delivers the video files to the upload server 108. In one embodiment, the front end interface 102 receives requests from users of the client 120 and delivers the requests to the other components of the video hosting site 100 (e.g., the video search module 106, the video serving module 104, etc.). For example, the front end interface 102 receives a video search query from a user and sends the video search query to the video search module 106.

The upload server 108 receives video files from the content provider 118 via the front end interface 102. In one embodiment, the upload server 108 processes the video files and stores the video files in the video database 116. For example, the upload server 108 assigns a video identification (video ID) to a video and stores the video and the video ID in the video database 116. Further examples of processing a video file by the upload server 108 include performing one or more of: formatting; compressing; metadata tagging; and content analysis, etc.

The video database 116 is a storage system that stores video files shared by the video hosting site 100 with the users. In one embodiment, the video database 116 stores the video files processed by the upload server 108. In another embodiment, the video database 116 stores metadata of the video files. For example, the video database 116 stores one or more of: a title; description; tag information; and administrative rights of a video file. The administrative rights of a video file include one or more of: the right to delete the video file; the right to edit information about the video file; and the right to associate the video file with an advertisement, etc. In one embodiment, some or all of the metadata of a video file is provided by the content provider 118. For example, the content provider 118 provides a title and a short description of a video when uploading the video to the video hosting site 100.

The video search module 106 is code and routines that, when executed by a processor (not pictured), processes any search queries received by the front end interface 102 from users. A search query from a user includes search criteria such as keywords that, for example, identify videos the user is interested in viewing. In one embodiment, the video search module 106 uses the search criteria to query the metadata of video files stored in the video database 116 and returns the search results to the user via the front end interface 102. For example, if a user provides a keyword search query to the video search module 106 via the front end interface 102, the video search module 106 identifies videos stored in the video database 116 matching the keyword and returns search results (e.g., video IDs, titles, descriptions, thumbnails of the identified videos) to the user via the front end interface 102.

The video serving module 104 is code and routines that, when executed by a processor (not pictured), processes requests for videos and serves videos to users. For example, the video serving module 104 receives a request for viewing a video from a user, retrieves the video from the video database 116 based at least in part on the request and presents the video to the user via the front end interface 102.

In one embodiment, the video serving module 104 receives a request from a user to access a video when the user clicks on a link to the video. The request received from the user includes the video ID of the video. In one embodiment, the video ID is included automatically in the request once the user clicks on the link for the video. The video serving module 104 uses the video ID to search and locate the video in the video database 116. Once the requested video is located, the video serving module 104 sends the video to the user via the front end interface 102. In one embodiment, the video is presented to the user on a web browser. Metadata associated with the video such as the title and description of the video is also presented to the user. In one embodiment, the video serving module 104 stores the video ID of the video in the user database 114 after sending the video to the user so that a video viewing history of the user is stored in the user database 114.

The user database 114 is a storage system that stores data and/or information associated with any user. For example, the user database 114 stores video IDs of video files uploaded by a user so that a video uploading history of the user is maintained in the user database 114. The user database 114 also stores video IDs of video files that the user has accessed from the video database 116 for viewing so that a video viewing history for the user is stored in the user database 114. In one embodiment, the user is identified by using a unique user name and password and/or by using the user's internet protocol address.

The thumbnail generator 112 is code and routines that generates a thumbnail for a video. A thumbnail is an image that represents a video on the video hosting site 100. For example, the thumbnail generator 112 analyzes the video and selects a frame from the video as the thumbnail. In one embodiment, the thumbnail generator 112 provides one or more images for the video and allows a publisher (e.g., a user uploading the video) to select one image as the thumbnail.

The feed database 126 is a storage system that stores data necessary to generating a user feed. The user feed is described in more detail below with reference to the feed serving module 124. The data stored in the feed database 126 includes a social feed. A social feed is data describing one or more activities performed by one or more users on the video hosting site 100 and/or the third-party site 128. In one embodiment, the social feed is processed by the feed serving module 124 and/or one or more modules stored on the front end interface 102 to generate the user feed. In one embodiment, the social feed is a data feed that includes a description of activities performed by one or more users on the video hosting site 100 and/or a description of activities performed by one or more users on a third-party site 128 (e.g., a social networking site, a third-party video hosting site, a video hosting site integrated with social networking features, an online bulletin board, etc.). In one embodiment, the feed database 126 stores all or a subset of the social feed.

An activity is an action taken on the video hosting site 100 and/or a third-party site 128. Examples of the activity include: viewing a video; making a comment on a video; sharing a video on a third-party site 128; rating a video; marking a video as a favorite video; marking a video as a liked video; uploading a video; subscribing to a video channel; adding a video to a playlist; managing a playlist; editing profile information; and/ or managing privacy settings, etc. In one embodiment, an activity performed by a user is associated with a user input. For example, if a user views a video by clicking a "play" button, a user input for the activity "viewing a video" is received by the video hosting site 100.

In one embodiment, the social feed includes a description of all onsite activities one or more users have performed on the video hosting site 100. In one embodiment, the video hosting site 100 only collects this information with the user's permission. An onsite activity is any activity performed by a user on the video hosting site 100. For example, the social feed includes one or more of: uploading a video on the video hosting site 100; viewing a video on the video hosting site 100; and marking a video as a favorite video on the video hosting site 100, etc. In one embodiment, the social feed includes a description of a subset of the onsite activities one or more user have performed on the video hosting site 100.

In another embodiment, the social feed includes a description of all offsite activities one or more users have performed on third-party sites such as the third-party site 128. In one embodiment, the video hosting site 100 only collects this information with the user's permission. An offsite activity is an activity performed on a third-party site 128. For example, if a user connects his/her account of the video hosting site 100 to his/her account of a third-party site 128 and allows the video hosting site 100 to monitor his/her activities on the third-party site 128, all his/her activities on the third-party site 128 are gathered by the video hosting site 100 and included in the social feed. In one embodiment, the social feed includes a description of a subset of the offsite activities one or more users have performed on the third-party site 128.

In yet another embodiment, the social feed includes a description of all the onsite and offsite activities of one or more users. In one embodiment, the video hosting site 100 only collects this information with the user's permission. In one embodiment, the social feed includes a description of a subset of the onsite activities one or more users have performed on the video hosting site 100 and/or a description of a subset of the offsite activities one or more users have performed on the third-party site 128.

The feed serving module 124 is code and routines that processes activities performed on the video hosting site 100 and/or third-party sites 128. For example, the feed serving module 124 monitors real-time activities performed on the video hosting site 100 and/or a third-party site 128 and processes the activities in real time. In one embodiment, the feed serving module 124 retrieves the activities from the social feed stored in the feed database 126. In another embodiment, the feed serving module 124 retrieves the activities in real time. For example, the feed serving module 124 monitors activities on the video hosting site 100 and/or the third-party sites 128 in real time. The feed serving module 124 stores a description of the real-time activities for later use as a part of the social feed in the feed database 126.

In one embodiment, the feed serving module 124 receives one or more user inputs for one or more activities performed on the video hosting site 100 or a third-party site 128. The one or more user inputs are associated with social activity information describing the one or more activities. The feed serving module 124 aggregates the social activity information based at least in part on the one or more user inputs to generate aggregated social activity information as the output and provides the aggregated social activity information to the user. In another embodiment, the feed serving module 124 filters the social activity information based at least in part on the one or more user inputs and generates filtered social activity information as an output. The feed serving module 124 provides the filtered social activity information to the user. In yet another embodiment, the feed serving module 124 determines video recommendations based at least in part on the one or more user inputs. The feed serving module 124 provides the video recommendations to the user. A video recommendation is a video recommended to a user. For example, the feed serving module 124 recommends videos to a user based at least in part on the user's video viewing history. In yet another embodiment, the feed serving module 124 ranks the social feed comprising the one or more activities and forms a ranked feed as an output. The feed serving module 124 provides the ranked feed to the user.

In one embodiment, the feed serving module 124 is configured to retrieve the social feed from the feed database 126, process the social feed and form a user feed as an output of processing the social feed. For example, the feed serving module 124 receives one or more activities comprised within the social feed and processes the one or more activities to form the user feed. The user feed is a feed of data and/or information that results from processing the social feed. In one embodiment, the user feed comprises one or more of: the aggregated social activity information; the filtered social activity information; video recommendations; and a ranked feed. In one embodiment, the user feed is stored in the feed database 126. The feed serving module 124 is described in further detail below with reference to FIG. 2.

The presentation module 110 is code and routines that, when executed by a processor (not pictured), presents any information intended for a user to a corresponding client device such as the client 120. For example, the presentation module 110 generates a graphic associated with the information and sends the graphic to a web browser (not pictured) installed in the client 120 via the front end interface 102 and the network 122. In one embodiment, the information intended for the user includes a user feed. In another embodiment, the information intended for the user includes a subset of the user feed. For example, the information intended for the user includes one or more of: the aggregated social activity information; the filtered social activity information; video recommendations; and a ranked feed.

The content provider 118 is any device that provides video files to the video hosting site 100. For example, the content provider 118 is a computing device that is used to upload video files to the video hosting site 100. The content provider 118 is communicatively coupled to the network 122. In one embodiment, the content provider 118 is also a client 120. In another embodiment, the content provider 118 is the same entity that operates the video hosting site 100.

In one embodiment, the content provider 118 is configured to be operated by a user to perform various content provider functions. Examples of content provider functions include, but are not limited to: uploading a video to the video hosting site 100; editing a video stored by the video hosting site 100; removing a video from the video hosting site 100; and editing content provider preferences associated with a video.

The client 120 is any processor-based computing device. The client 120 stores and executes a client software such as a web browser and connects to the video hosting site 100 using the client software via the network 122. In one embodiment, the client 120 includes a variety of different computing devices. Examples of a client 120 include, but are not limited to: a personal computer; a personal digital assistant; a television set-up box; a tablet computer; a smart phone; and a laptop computer. The client 120 comprises one or more processors (not pictured), a memory (not pictured) and other components conventional to a computing device. In one embodiment, the client 120 is communicatively coupled to the network 122.

In one embodiment, the client 120 is configured as a content provider 118 to provide video files to the video hosting site 100. In another embodiment, the client 120 is configured to view videos provided by the video hosting site 100. For example, the client 120 includes an embedded video player (e.g., the Flash™ player from Adobe System, Inc.) adapted for the video file formats used in the video hosting site 100 so that a user is able to view a video from the video hosting site 100 using the embedded video player in the client 120.

The front end interface 102, the video serving module 104, the video search module 106, the upload server 108, the presentation module 110, the thumbnail generator 112, the user database 114, the video database 116, the feed serving module 124 and the feed database 126 are communicatively coupled to one another via one or more signal lines. In one embodiment, the front end interface 102, the video serving module 104, the video search module 106, the upload server 108, the presentation module 110, the thumbnail generator 112, the user database 114, the video database 116, the feed serving module 124 and the feed database 126 are communicatively coupled to one another via a bus (not pictured).

Feed Serving Module

Figure 2:
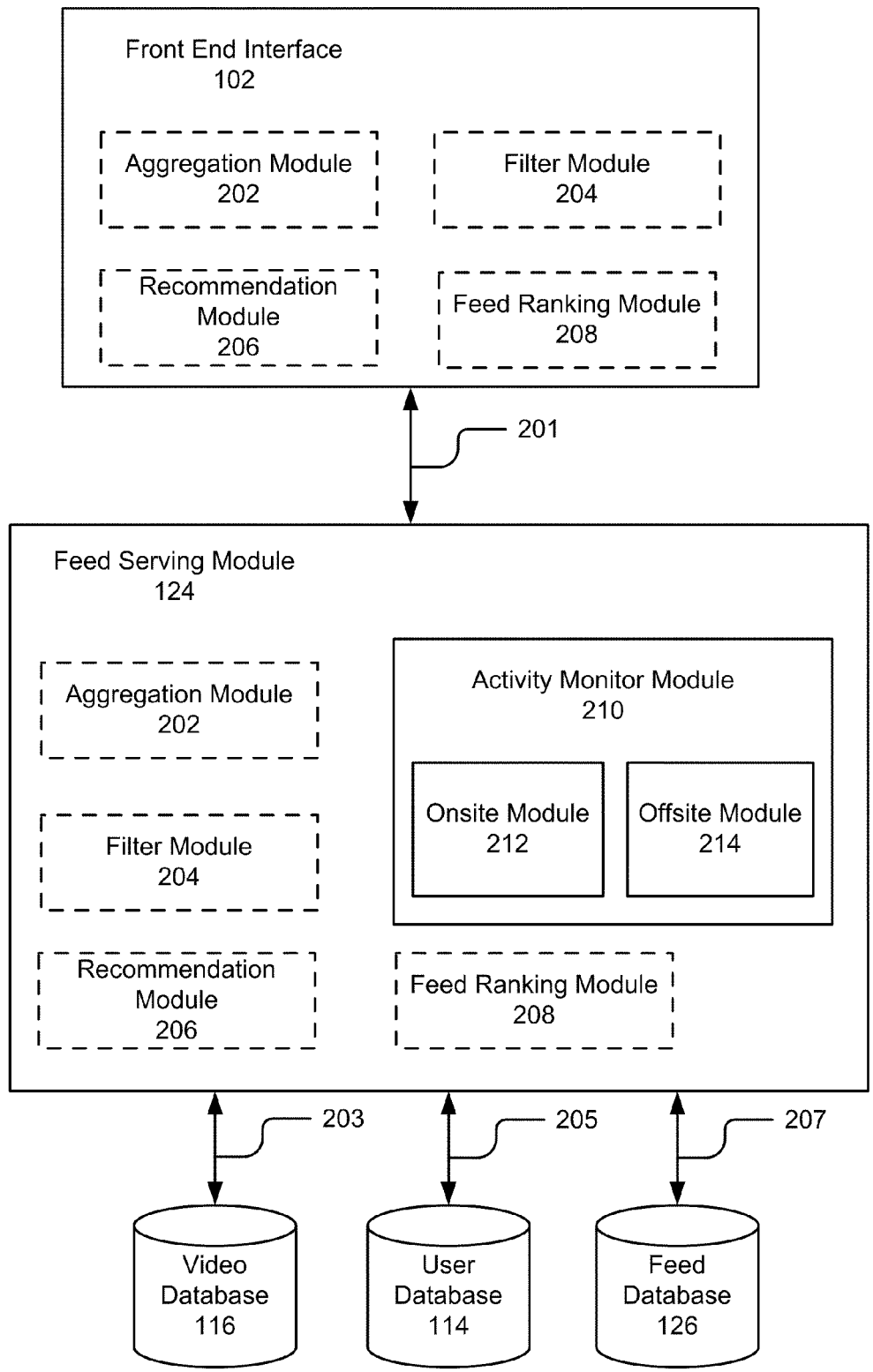
FIG. 2 is a block diagram illustrating a feed serving module according to one embodiment.

FIG. 2 is a block diagram illustrating the feed serving module 124 according to one embodiment. In the illustrated embodiment, the feed serving module 124 includes: an aggregation module 202; a filter module 204; a recommendation module 206; a feed ranking module 208; and an activity monitor module 210. Here, the aggregation module 202, the filter module 204, the recommendation module 206 and the feed ranking module 208 are depicted by a rectangle formed from a dashed line to indicate that in one embodiment one or more of the aggregation module 202, the filter module 204, the recommendation module 206 and the feed ranking module 208 are comprised within the feed serving module 124, while in another embodiment one or more of the aggregation module 202, the filter module 204, the recommendation module 206 and the feed ranking module 208 are comprised within the front end interface 102. For example, in one embodiment, the aggregation module 202 and the filter module 204 are comprised within the feed serving module 124, while the recommendation module 206 and the feed ranking module 208 are comprised within the front end interface 102.

The feed serving module 124 is communicatively coupled to the front end interface 102 via signal line 201. For example, in one embodiment the feed serving module 124 sends the user feed to the front end interface 102 via the signal line 201 and the front end interface 102 delivers the user feed to the client 120 via the network 122 described above with reference to FIG. 1. The feed serving module 124 is also communicatively coupled to the video database 116 via signal line 203, the user database 114 via signal line 205 and the feed database 126 via signal line 207. For example, the feed serving module 124 retrieves the information describing the social feed from the feed database 126 via the signal line 207, generates information describing a user feed based at least in part on the information describing the social feed and stores the information describing the user feed on the feed database 126 via the signal line 207. In one embodiment, the feed serving module 124 retrieves video viewing history of a user from the user database 114 via the signal line 205. For example, the feed serving module 124 retrieves the video IDs of video files viewed by the user from the user database 114 via the signal line 205. In another embodiment, the feed serving module 124 retrieves video IDs and metadata of videos associated with the video IDs (e.g., titles, descriptions, etc., of the videos) from the video database 116 via the signal line 203. For example, the feed serving module 124 retrieves the video IDs and metadata associated with videos recommended to a user from the video database 116 via the signal line 203 and sends the video IDs and the metadata to the presentation module 110 for presentation to the user.

The aggregation module 202 is code and routines for aggregating social activity information. For example, the aggregation module 202 retrieves one or more user inputs for one or more activities, processes the one or more user inputs to aggregate the social activity information associated with the one or more user inputs and generates aggregated social activity information as an output. In one embodiment, the aggregation module 202 is communicatively coupled to the feed database 126 to retrieve the social feed from the feed database 126 via the signal line 207. The social feed includes one or more activities. The one or more activities are activities performed on the video hosting site 100 and/or the third-party sites 128. In one embodiment, instead of retrieving the social feed the aggregation module retrieves the one or more activities from the feed database 126 via the signal line 207.

In one embodiment, the one or more activities provide social activity information associated with the user or the user's friends. For example, the one or more activities are activities performed by one or more friends of a first user. In one embodiment, a friend of the first user is any second user of the video hosting site 100 that is associated with the first user as a friend of the first user. In another embodiment, a friend of the first user includes any second user of the video hosting site 100 that connects to the first user via a social graph. For example, if the first user and the second user are associated as friends, and a third user is associated as a friend of the second user, then the third user is also associated as a friend of the first user. In one embodiment, these various friendship associations are used to generate the user feed and are stored in the feed database 126.

In another embodiment, the one or more activities provide social activity information associated with one or more prominent videos on the video hosting site 100. For example, the one or more activities describe posting one or more new comments for a prominent video. Examples of a prominent video include, but are not limited to: a most popular video; a frequently favorited video; and a featured video, etc.

A popular video is a video that has been viewed a predetermined number of times, a video that is trending upwards in popularity on the video hosting site 100 and/or one or more third-party sites 128, and/or a video that meets any other criteria known in the art for determining a popular video. For example, a popular video is a video that has been viewed one million or more times. In another example, a popular video is a video that is trending in popularity with a user's friends or the members of the user's social graph. The popularity of a video is determined based at least in part on one or more of: a video view count (e.g., the number of views for the video); a video sharing count (e.g., the number of times that the video is shared on a third-party site 128); user ratings of the video; a liked count (e.g., the number of likes of the video); a disliked count (e.g., the number of dislikes of the video); and/or a comment count (e.g., the number of comments attached to the video), etc.

A frequently favorited video is a video that has been selected as a "favorite" video by a predetermined number of users, a video that is trending upward in being selected as a "favorite" by a user's friends or the members of the user's social graph, and/or a video that meets any other criteria known in the art for determining a frequently favorited video. For example, a frequently favorited video is a video that has been selected as a "favorite" by one million users. In another example, a frequently favorited video is a video that is trending in being selected as a "favorite" by a user's friends or the members of the user's social graph.

A featured video is a video that an administrator of the video hosting site 100 has designated as being a featured video and/or a video that meets any other criteria known in the art for determining a featured video. In one embodiment, a featured video is a video that is related to the content of a video currently being viewed by a user of the client device 120 (or the user's friends) or is related to one or more videos that have recently been viewed by the user of the client device 120. In one embodiment, a featured video is a video pulled from a pool of content partner videos stored in the video database 116. A content partner video is a video uploaded by a content partner. A content partner is a user of a content provider 118 having a revenue sharing relationship with the owner of the video hosting site 100. In one embodiment, a featured video is selected for display in a feed based at least in part on the geographic location of the client device 120.

In one embodiment, the aggregation module 202 is configured to aggregate the social activity information describing the one or more activities based at least in part on one or more common users associated with the one or more user inputs. The aggregation module 202 determines one or more users for the one or more user inputs. For example, the aggregation module 202 determines one or more users for the one or more user inputs based at least in part on all (or a subset of) the information stored in the user database 114 and/or all (or a subset of) the information stored in the feed database 126. The aggregation module 202 separates the one or more user inputs into one or more groups so that each group of user inputs has a common user. The aggregation module 202 aggregates the social activity information for each group of user inputs based at least in part on the common user.

For example, the aggregation module 202 receives four user inputs for four activities. Each user input is for a different user activity, so that there are four user inputs in total, and four activities each represented by a different one of the four user inputs. The first and second user inputs are provided by a first friend of the first user (e.g., the first friend is a user named "Alice"). The third and fourth user inputs are provided by a second friend of the first user (e.g., the second friend is a user named "Bob"). The aggregation module 202 divides the four user inputs into two groups based at least in part on the common users so that the first group includes the first and second user inputs provided by Alice and the second group includes the third and fourth user inputs provided by Bob. The common user for the first group is Alice. The common user for the second group is Bob. The aggregation module 202 aggregates each group of user inputs separately. For example, if the first group of user inputs describes Alice uploading two different videos to the video hosting site 100, the aggregation module 202 aggregates the first group of user inputs as "Alice has uploaded two new videos." A similar aggregation occurs for Bob, e.g., "Bob has commented on two videos." The result of this aggregation is that all of Alice's activities are aggregated into a first aggregated description (e.g., "Alice has uploaded two videos") and all of Bob's activities are aggregated into a second aggregated description (e.g., "Bob has commented on two videos"). In other systems, each activity receives its own description, so that instead of having four activities described by two aggregated descriptions, the four activities are described by four descriptions. The above-described aggregation provides numerous benefits. For example, since each common user's actions are aggregated into a aggregated description, the user interface is less cluttered and has more room to describe the activities of more users.

In another embodiment, the aggregation module 202 is configured to aggregate the social activity information based at least in part on one or more common videos associated with the one or more user inputs. The aggregation module 202 determines one or more videos that the one or more user inputs are associated with. For example, the aggregation module 202 determines one or more videos associated with the one or more user inputs based at least in part on all (or a subset of) the information stored in the user database 114 and/or all (or a subset of) the information stored in the feed database 126. The aggregation module 202 separates the one or more user inputs into one or more groups so that each group is associated with a common video. The aggregation module 202 aggregates the social activity information for each group based at least in part on the common video associated with the group. For example, the aggregation module 202 receives four user inputs for four activities. The first and second user inputs are associated with a first video (e.g., the first and second user inputs are comments on the first video). The third and fourth user inputs are associated with a second video (e.g., the third user input is a comment on the second video and the fourth user input is a "favorite" input for the second video). The aggregation module 202 divides the four user inputs into two groups so that the first group includes the first and second user inputs associated with the first video and the second group includes the third and fourth user inputs associated with the second video. The aggregation module 202 aggregates each group of user inputs separately based at least in part on the common video. For example, if the first group of user inputs describes posting two new comments for the first video (e.g., named "Charlie Bit My Finger"), the aggregation module 202 aggregates the first group of user inputs as "The video 'Charlie Bit My Finger' has two new comments."

In yet another embodiment, the aggregation module 202 is configured to aggregate the social activity information based at least in part on one or more classifications associated with the one or more user inputs. The classifications include one or more of the following: an action taken on a social networking site; an action taken on an online bulletin board; making a comment on a video site; uploading a video to the video site; marking a video as a favorite video; and marking a video as a liked video.

In one embodiment, different classifications have a predetermined level of importance stored in the feed database 126 and the aggregation module 202 is configured to aggregate the activities based at least in part on the relative importance of the classification to which the activity belongs. Specifically, the following list ranks the classifications based at least in part on importance so that the most important classification is listed first and the least important classification is listed last: (1) an action taken on a social networking site; (2) an action taken on an online bulletin board; (3) making a comment on a video site; (4) uploading a video to the video site; (4) marking a video as a favorite video; and (5) marking a video as a liked video. In one embodiment, the feed database 126 stores data that indicates the above described hierarchy. In one embodiment, the level of importance for each classification is set by the user so that the user can define the hierarchy of importance for the different classifications.

In one embodiment, the aggregation module 202 receives one or more user inputs for one or more activities having a common user and a common video. The aggregation module 202 determines the common user and/or the common video for the one or more user inputs. For example, the aggregation module 202 determines a user name for the common user and a video ID for the common video. The aggregation module 202 classifies the one or more user inputs into one or more groups so that each group of user inputs is associated with a classification. The aggregation module 202 aggregates the social activity information based at least in part on the one or more classifications associated with the one or more groups of user inputs.

In another example, the aggregation module 202 receives three user inputs for three activities. The three user inputs are provided by a common user (e.g., "Alice") and related to a common video (e.g., named "Charlie Bit My Finger"). The first user input refers to Alice marking the video "Charlie Bit My Finger" as a favorite video. The second user input refers to Alice sharing the video on a first social networking site. The third user input refers to Alice sharing the video on a second social networking site. The first user input is associated with a first classification of "marking a video as a favorite video" and the second and third user inputs are associated with a second classification of "an action taken on a social network site" (e.g., sharing a video on a social networking site). The aggregation module 202 aggregates the social activity information associated with the three user inputs based at least in part on the first and second classifications. For example, if the second classification has a higher level of importance than the first classification, the aggregation module 202 aggregates the social activity information for the three user inputs as "Alice" has shared the video 'Charlie Bit My Finger' on two social networking sites."

In one embodiment, the aggregation module 202 is communicatively coupled to the feed database 126, the presentation module 110 and the activity monitor module 210. In one embodiment, the aggregation module 202: (1) retrieves the social feed from the feed database 126; (2) sends the aggregated social activity information to the presentation module 110 for presentation to a user; and (3) receives one or more user inputs for one or more activities from the activity monitor module 210. In another embodiment, the one or more user inputs for the one or more activities are received by the aggregation module 202 in real time.

The filter module 204 is code and routines for filtering social activity information. For example, the filter module 204 is a filter that identifies unique sources of information and organizes the social activity information based at least in part on the unique sources. In one embodiment, a unique source is a user with a unique user name or a video with a unique video ID. The filter module 204 then generates filtered social activity information as an output based at least in part on the organization of the social activity information.

The filter module 204 is communicatively coupled to the feed database 126 to receive one or more user inputs for one or more activities from the feed database 126. In one embodiment, the one or more user inputs are for activities from the social feed retrieved from the feed database 126. In another embodiment, the one or more user inputs are for activities monitored by the activity monitor module 210. The one or more activities can be real-time or delayed by any amount of time. The activity monitor module 210 is described in more detail below. In yet another embodiment, the activity monitory module 210 is communicatively coupled to the front end interface 102 to receive one or more user inputs for one or more activities from the front end interface 102.

The filter module 204 determines one or more first sources for the one or more user inputs. For example, the filter module 204 determines a user for each user input. Further examples of a first source include, but are not limited: a video; a video channel; and a subscription. In one embodiment, the filter module 204 is configured to determine one or more unique sources from all the first sources for the one or more user inputs. For example, the filter module 204 determines one or more unique users as unique sources from all the users for all the user inputs. If two or more user inputs have a common user, the filter module 204 determines the common user as the unique source for the two or more user inputs. Alternatively, if two or more of the user inputs are provided by different users, the filter module 204 determines different unique sources for the user inputs. For example, if the filter module 204 receives three user inputs with a first user input provided by a first user and a second and third user inputs provided by a second user, the filter module 204 determines two unique sources for the three user inputs. The first unique source is the first user and the second unique source is the second user.

In one embodiment, the filter module 204 is configured to filter the social activity information based at least in part on the one or more unique sources. The filter module 204 determines which portion of the social activity information is presented to a client 120 based at least in part on the unique sources. For example, the filter module 204 determines that the social activity information associated with a first user input provided by a user is presented to a client 120, while the social activity information associated with a second user input provided by the same user is not presented to the client 120.

In one embodiment, the filter module 204 determines the social activity information to be presented to a client 120 based at least in part on a display limitation. The display limitation is a limitation of displaying social activity information on a client 120. For example, the display limitation is a limitation on display space available for presenting the social activity information. In one embodiment, the filter module 204 receives an input from the client 120 defining the display limitation. In another embodiment, the filter module 204 receives an input from an administrator of the video hosting site 100 defining the display limitation.

In one embodiment, the filter module 204 determines a portion of the social activity information associated with a unique source to be displayed on the client 120, and allocates a portion of the display space to display the portion of the social activity information. The filter module 204 then determines whether the display limitation is met. For example, the filter module 204 determines whether any portion of the display space is still available for display. If the display limitation is not met, the filter module 204 continues to allocate a portion of the available display space to display other portions of the social activity information associated with other unique sources. All the portions of the social activity information determined to display on the client 120 with allocated display space are referred to as the filtered social activity information. If the display limitation is met, the filter module 204 sends the filtered social activity information to the presentation module 110 for presentation to a user.

In one embodiment, the filter module 204 is communicatively coupled to the feed database 126, the presentation module 110 and the activity monitor module 210. In one embodiment, the filter module 204: (1) retrieves the social feed from the feed database 126; (2) sends the filtered social activity information to the presentation module 110 for presentation to a user; and (3) receives one or more activities from the activity monitor module 210. In one embodiment, the one or more activities from the activity monitor module 210 are received in real time.

The recommendation module 206 is code and routines for recommending videos to a user on the video hosting site 100. For example, the recommendation module 206 recommends a set of videos to a user based at least in part on profile information of the user such as age, geographic information, interests, demographic information, education/working experiences, etc. In one embodiment, the recommendation module 206 retrieves video IDs and metadata (e.g., titles, descriptions, etc.) of the set of videos recommended to the user from the video database 116 and sends the video IDs and the metadata to the presentation module 110 for presentation to the user.

In one embodiment, the recommendation module 206 is configured to determine video recommendations for a first user based on the first user's activities on the video hosting site 100. For example, the recommendation module 206 recommends videos to the first user based at least in part on the first user's video viewing history. The recommendation module 206 retrieves the first user's video viewing history from the user database 114. For example, the recommendation module 206 retrieves the video IDs of the videos viewed by the first user from the user database 114 and/or the metadata of the videos from the video database 116. In one embodiment, the recommendation module 206 determines video recommendations for the first user based at least in part on one or more of: a video viewed by the first user; a video marked as a favorite video by the first user; a video marked as a liked video by the first user; a video viewed by the first user on a third-party site 128; and a video shared by the first user on a third-party site 128.

In another embodiment, the recommendation module 206 is configured to determine video recommendations for a first user based at least in part on activities performed by one or more friends of the first user. As explained above, a friend is a second user that is associated as a friend with the first user. The friendship association is stored on the video hosting site 100 (e.g., the feed database 126, the user database 114, etc.). The activities include onsite activities and/or offsite activities of the one or more friends for the first user. In one embodiment, the onsite activities and/or offsite activities of the one or more friends are tracked and recorded by the video hosting site 100 with the permission of the one or more friends. In one embodiment, the recommendation module 206 determines video recommendations to the user based at least in part on video viewing history of the friends. For example, the recommendation module 206 recommends the videos that the friends of the user are currently viewing on the video hosting site 100 or a third-party site 128 to the user. In other embodiments, the recommendation module 206 determines video recommendations for the first user based at least in part on one or more of: videos viewed by friends in the past on the video hosting site 100 or a third-party site 128; videos being viewed by the friends on the video hosting site 100 or a third-party site 128; videos being viewed by the friends in real time on the video hosting site 100 or a third-party site 128; videos marked as favorite videos by the friends on the video hosting site 100 or a third-party site 128; videos marked as liked videos by the friends on the video hosting site 100 or a third-party site 128; and videos shared by the friends on the video hosting site 100 or a third-party site 128.

In yet another embodiment, the recommendation module 206 is configured to determine video recommendations for the first user based at least in part on activities performed by any users on the video hosting site 100. For example, the ensemble activities of all the users on the video hosting site 100 determine which videos are popular on the video hosting site 100. In one embodiment, the recommendation module 206 recommends videos to the user based at least in part on popularity of the videos on the video hosting site 100. The popularity of a video is determined based at least in part on one or more of: a video view count; a video sharing count; a favorite count (e.g., the number of times that the video is marked as a favorite video); the user ratings of the video; a liked count; a disliked count; and/or a comment count, etc. In one embodiment, the recommendation module 206 recommends videos with highest video view counts and/or highest favorite counts within a period of time to the user.

In one embodiment, the recommendation module 206 is communicatively coupled to the user database 114, the video database 116, the activity monitor module 210, the feed database 126 and the presentation module 110. In one embodiment, the recommendation module 206 performs one or more of the following steps: (1) retrieves video viewing history of a first user and the first user's friends from the user database 114; (2) receives one or more activities from the activity monitor module 210; (3) receives one or more activities from the social feed retrieved from the feed database 126; (4) sends the video recommendations to the presentation module 110 for presentation to the first user; and (5) retrieves video IDs and metadata of the videos recommended for the first user from the video database 116. In one embodiment, the recommendation module 206 receives one or more activities from the activity monitor module 210 in real time. In another embodiment, the recommendation module 206 sends the video IDs and the metadata of the videos recommended for the first user to the presentation module 110 for presentation to the first user.

The feed ranking module 208 is code and routines for ranking the social feed to generate a ranked feed. For example, the feed ranking module 208 receives the social feed comprising one or more activities from the feed database 126, rank the social feed based at least in part on the one or more activities and forms a ranked feed as an output.

In one embodiment, the feed ranking module 208 is configured to rank the social feed based at least in part on one or more scores associated with the one or more activities. The one or more activities are associated with one or more videos published by one or more publishers (i.e., users who upload the videos on the video hosting site 100 and/or the third-party site 128 and publish the videos on the site). The feed ranking module 208 receives one or more user inputs for the one or more activities comprised within the social feed. The feed ranking module 208 calculates a score for each activity. The feed ranking module 208 forms a ranked feed so that a first activity with a higher score is listed before a second activity with a lower score in the ranked feed.

The score for an activity associated with a video published by a publisher is determined based at least in part on one or more of: a video view count; a video sharing count; a favorite count; user ratings of the video; a liked count; a disliked count; a comment count; age of the video; a video tag; whether the video is a popular video; whether the video is a featured video; the publisher's total video views on the video hosting site 100; the publisher's video count (e.g., the number of videos published by the publisher); the publisher's subscriber/friend count (e.g., the number of subscribers/friends of the publisher); the publisher's account age; and ratios between any two of the above items (e.g., the ratio of a video view count to video age, the ratio of a liked count to a disliked count, etc.). For example, if two videos have the same video age, a first activity associated with a first video having a higher video view count has a higher score than a second activity associated with a second video having a lower video view count.

In one embodiment, the feed ranking module 208 is communicatively coupled to the feed database 126, the activity monitor module 210 and the presentation module 110. In one embodiment, the feed ranking module 208: (1) receives the social feed from the feed database 126; (2) receives one or more activities from the activity monitor module 210; (3) sends the ranked feed to the presentation module 110 for presentation to the client 120; and (4) stores the ranked feed in the feed database 126.

The activity monitor module 210 is code and routines for monitoring activities on the video hosting site 100 and other third-party sites 128. For example, the activity monitor module 210 receives a user input for an activity performed on the video hosting site 100 or a third-party site 128. In one embodiment, activity monitor module 210 receives a user input for an activity performed on the video hosting site 100 or a third-party site 128 in real time. The activity monitor module 210 comprises an onsite module 212 and an offsite module 214.

The onsite module 212 is code and routines for monitoring onsite activities on the video hosting site 100. For example, the onsite module 212 is a daemon that monitors the video hosting site 100 and receives a user input if an activity is performed on the video hosting site 100. In one embodiment, the onsite module 212 monitors the video hosting site 100 in real time. In one embodiment, the onsite module 212 is communicatively coupled to the aggregation module 202, the filter module 204, the recommendation module 206, the feed database 126 and the user database 114. For example, the onsite module 212 stores the onsite activities as a part of the social feed in the feed database 126, stores the video IDs of the videos viewed by a user in the user database 114 and sends the user inputs for the onsite activities to the aggregation module 202, the filter module 204 and the recommendation module 206.

The offsite module 214 is code and routines for monitoring offsite activities on a third-party site 128. For example, the offsite module 214 is a daemon that monitors the third-party site 128 and receives a user input if an activity is performed on the third-party site 128. In one embodiment, the offsite module 214 monitors the offsite activities of users with the permission of those users. For example, the users establish connections between the video hosting site 100 and the third-party site 128 and allow sharing of social activity information between the video hosting site 100 and the third-party site 128. The offsite module 214 monitors the third-party site 128 (optionally, in real time) and receives a user input if an activity is performed on the third-party site 128. For example, the offsite module 214 receives a user input if a user is viewing a video on the third-party site 128. In one embodiment, the offsite module 214 is communicatively coupled to the aggregation module 202, the filter module 204, the recommendation module 206, the feed database 126 and the user database 114. For example, the offsite module 214 sends the user inputs for the offsite activities to the aggregation module 202, the filter module 204 and the recommendation module 206, stores the offsite activities as a part of the social feed in the feed database 126 and stores the video IDs of the videos viewed by the user on the third-party site 128 in the user database 114.

In one embodiment, the user feed comprises one or more of: the aggregated social activity information from the aggregation module 202; the filtered social activity information from the filter module 204; the video recommendations from the recommendation module 206; and the ranked feed from the feed ranking module 208. The user feed is sent to the presentation module 110, causing the presentation module 110 to generate a graphic associated with the user feed and provide the graphic to the user.

Methods

Figure 3:
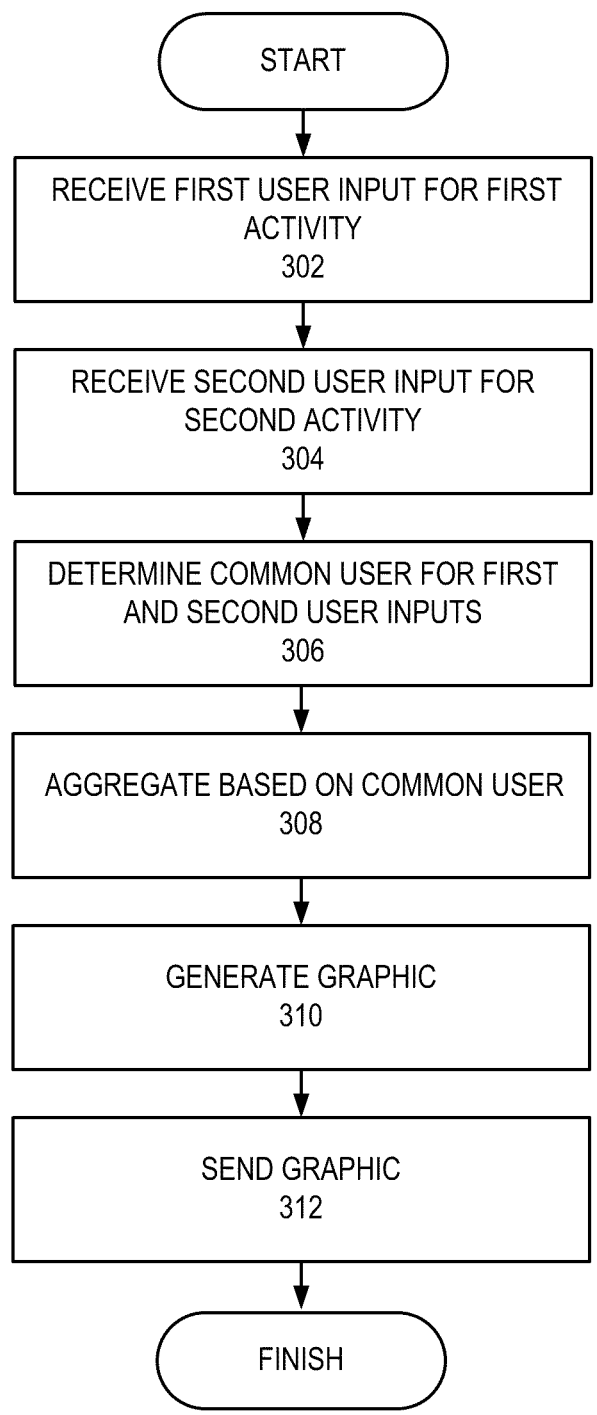
FIG. 3 is a flow diagram of a method for aggregating social activity information based at least in part on a common user according to one embodiment.

FIG. 3 is a flow diagram 300 of a method for aggregating social activity information based at least in part on a common user according to one embodiment. The aggregation module 202 receives 302 a first user input for a first activity. The first user input is associated with social activity information describing the first activity. The aggregation module 202 receives 304 a second user input for a second activity. The second user input is associated with social activity information describing the second activity. In one embodiment, the aggregation module 202 receives the one or more inputs for the activities of steps 402 and 404 from the activity monitor module 210 (optionally, these inputs are received in real time). In another embodiment, the aggregation module 202 receives the inputs for the activities of steps 402 and 404 from the social feed retrieved from the feed database 126.

The first and second user inputs have a common user that provides the user inputs. The aggregation module 202 determines 306 the common user for the first and second user inputs. For example, the aggregation module 202 determines the unique user name for the common user. The aggregation module 202 aggregates 308 the social activity information for the first and second user inputs based at least in part on the common user to form aggregated social activity information as an output. For example, if the first and second user inputs are associated with a user (e.g., the user is a user named "Alice") uploading two videos on the video hosting site 100, the aggregation module 202 aggregates the social activity information for the user inputs as "Alice has uploaded two new videos." The aggregation module 202 sends the aggregated social activity information to the presentation module 110

The presentation module 110 generates 310 a graphic based at least in part on the aggregated social activity information received from the aggregation module 202. The graphic is associated with the aggregated social activity information for the first and second user inputs. In one embodiment, the graphic is configured to display the aggregated social activity information to the client 120. The presentation module 110 sends 312 the graphic to the client 120 for presentation to a user. For example, the presentation module 110 sends the graphic to a web browser (not pictured) of the client 120, causing the web browser to display the aggregated social activity information to the user using the graphic. In one embodiment, if the user clicks on the aggregated social activity information shown in the graphic, all the social activity information before aggregation is shown to the user.

Figure 4:
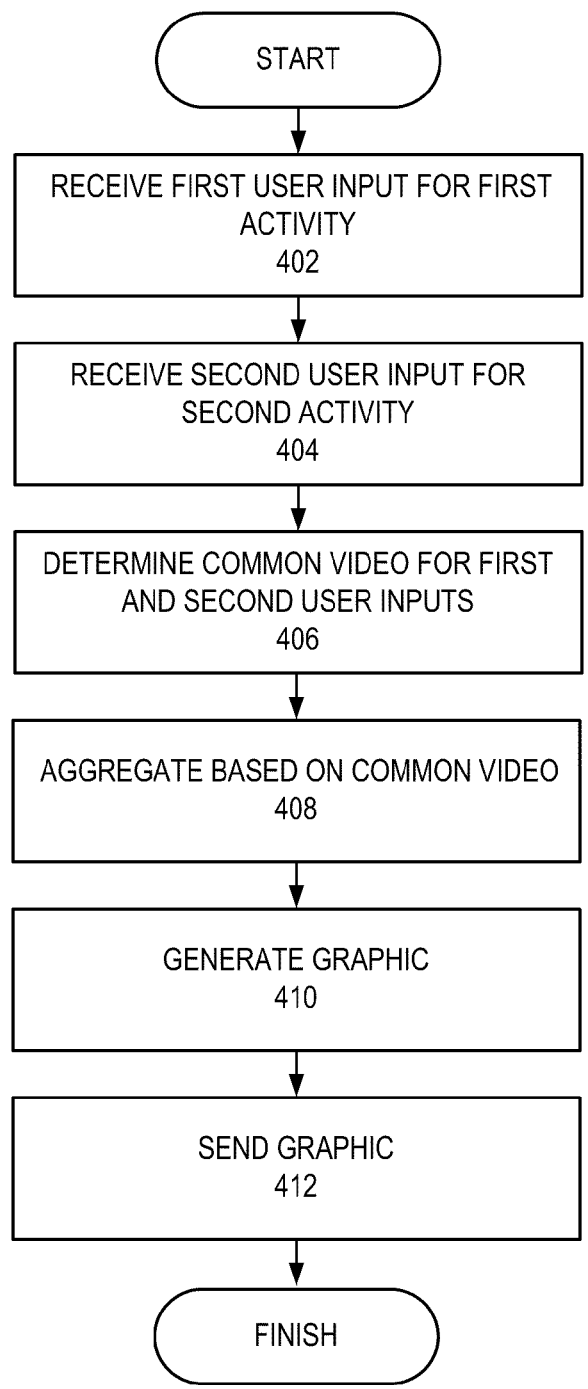
FIG. 4 is a flow diagram of a method for aggregating social activity information based at least in part on a common video according to one embodiment.

FIG. 4 is a flow diagram 400 of a method for aggregating social activity information based at least in part on a common video according to one embodiment. The aggregation module 202 receives 402 a first user input for a first activity. The first user input is associated with social activity information describing the first activity. The aggregation module 202 receives 404 a second user input for a second activity. The second user input is associated with social activity information describing the second activity.

The first and second user inputs have a common video that is associated with the user inputs. The aggregation module 202 determines 406 the common video for the first and second user inputs. For example, the aggregation module 202 determines the video ID for the common video. The aggregation module 202 aggregates 408 the social activity information for the first and second user inputs based at least in part on the common video to form aggregated social activity information. For example, if the first and second user inputs are associated with a video (e.g., named "Charlie Bit My Finger") with the first user input referring to posting a first comment on the video by a first user and the second user input referring to posting a second comment on the video by a second user, the aggregation module 202 aggregates the social activity information for the user inputs as "The video Charlie Bit My Finger has two new comments." The aggregation module 202 sends the aggregated social activity information to the presentation module 110.

The presentation module 110 generates 410 a graphic based at least in part on the aggregated social activity information received from the aggregation module 202. The graphic is associated with the aggregated social activity information for the first and second user inputs. In one embodiment, the graphic is configured to display the aggregated social activity information to the client 120. The presentation module 110 sends 412 the graphic to the client 120 for presentation to a user. For example, the presentation module 110 sends the graphic to the web browser of the client 120 and the web browser presents the social activity information to the user using the graphic.

Figure 5:
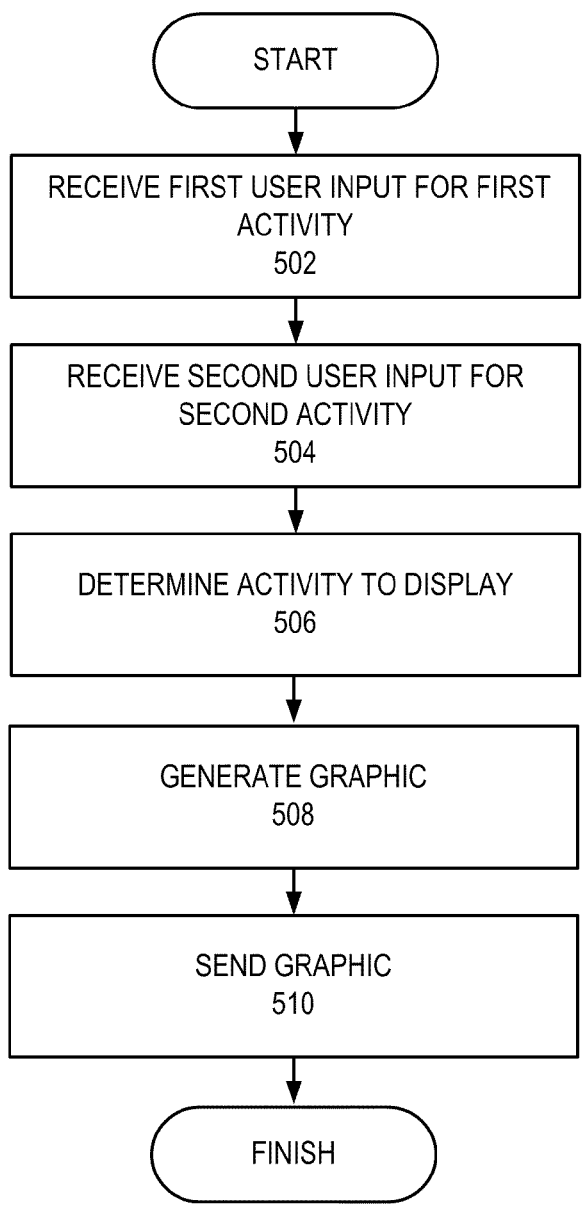
FIG. 5 is a flow diagram of a method for aggregating social activity information based at least in part on a common user and a common video according to one embodiment.

FIG. 5 is a flow diagram 500 of a method for aggregating social activity information based at least in part on a common user and a common video according to one embodiment. The aggregation module 202 receives two activities. The aggregation module 202 receives 502 a first user input for a first activity. The first user input is associated with social activity information describing the first activity. The aggregation module 202 receives 504 a second user input for a second activity. The second user input is associated with social activity information describing the second activity.

The first and second user inputs have a common video and a common user. The aggregation module 202 determines the common video and the common user for the first and second user inputs. For example, the aggregation module 202 determines the video ID for the common video and the user name for the common user. The aggregation module 202 classifies the two user inputs into one or two groups so that each group is associated with a classification. The aggregation module 202 aggregates the social activity information for the two user inputs based at least in part on one or two classifications associated with the one or two groups. In one embodiment, the aggregation module 202 determines 506 one or two activities from the first and second activities to be displayed to a client 120 based at least in part on the one or two classifications. The presentation module 110 generates 508 a graphic based at least in part on the aggregated social activity information received from the aggregation module 202. In one embodiment, the graphic is configured to display the aggregated social activity information to the client 120. The presentation module 110 sends 510 the graphic to the client 120 for presentation to a user. For example, the presentation module 110 sends the graphic to the web browser of the client 120 and the web browser presents the aggregated social activity information to the user using the graphic.

Figure 6:
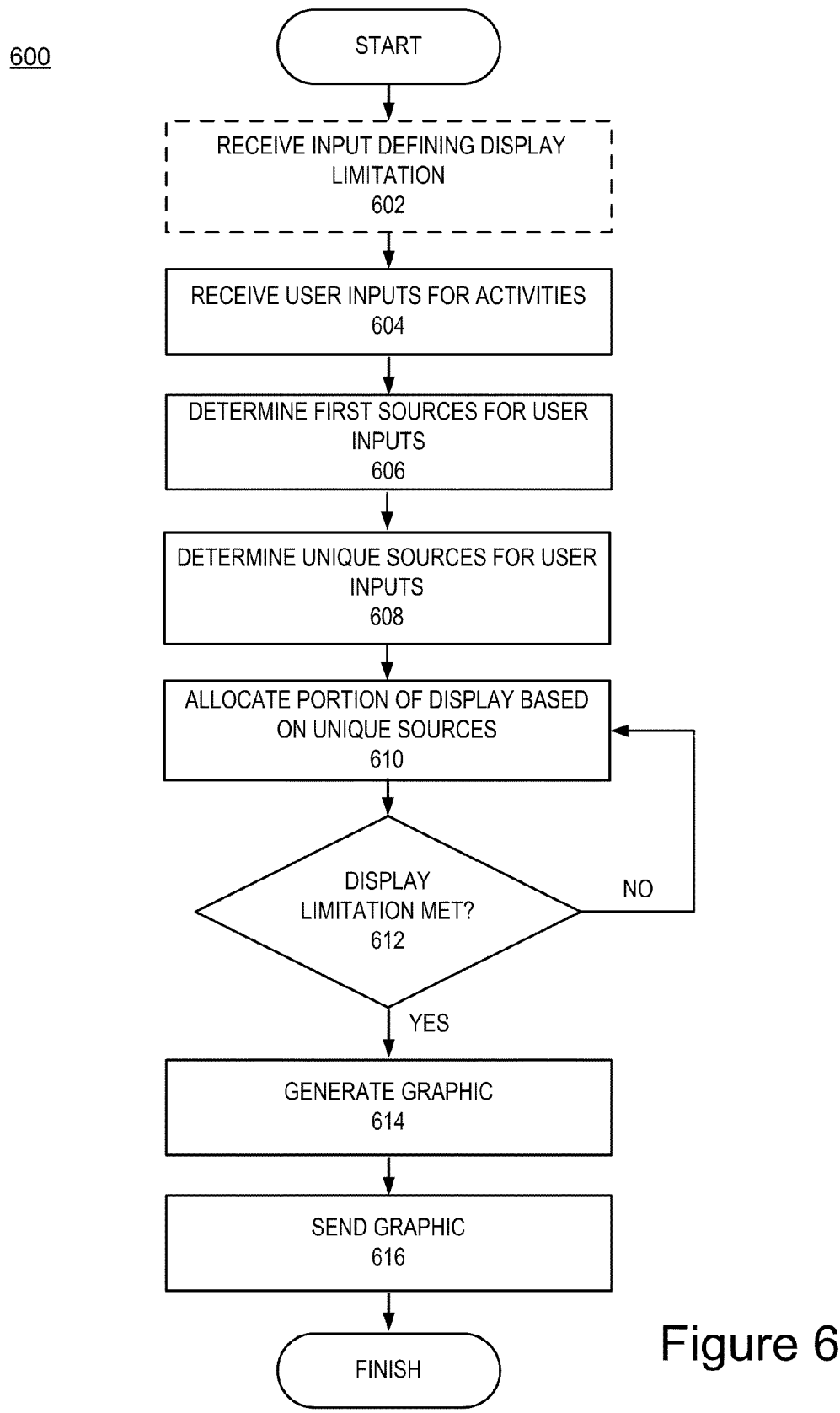
FIG. 6 is a flow diagram of a method for filtering social activity information according to one embodiment.

FIG. 6 is a flow diagram 600 of a method for filtering social activity information according to one embodiment. In one embodiment, a unique source is a user with a unique user name. In another embodiment, a unique source is a video with a unique video ID. The filter module 204 receives 602 an input defining a display limitation. For example, the filter module 204 receives an input describing a limited display space available for presenting social activity information to a client 120. In one embodiment, the filter module 204 receives an input from the client 120 describing the display limitation. In another embodiment, the filter module 204 receives an input from an administrator of the video hosting site 100 describing the display limitation. Here, step 602 is depicted with a rectangle formed by a dashed line to indicate that step 602 is an optional feature of the method. For example, in other embodiments the display limitation is automatically set up by the filter module 204 and no input is required to define the display limitation.

The filter module 204 receives 604 one or more user inputs for one or more activities. The one or more user inputs are associated with social activity information describing the one or more activities. In one embodiment, the one or more activities are activities from the social feed retrieved from the feed database 126. In another embodiment, the one or more activities are one or more activities monitored by the activity monitor module 210.

The filter module 204 determines 606 one or more first sources for the one or more user inputs. For example, in one embodiment a first source is a user providing a user input and the filter module 204 determines one or more users as one or more sources for the one or more user inputs. The filter module 204 determines 608 one or more unique sources from the one or more first sources. In one embodiment, if two or more user inputs have a common user, the filter module 204 determines the common user as the unique source for the two or more user inputs. Alternatively, if two or more of the user inputs are provided by different users, the filter module 204 determines different unique sources for the user inputs. For example, if the filter module 204 receives three user inputs with a first user input provided by a first user and a second and third user inputs provided by a second user, the filter module 204 determines two unique sources for the three user inputs. The first unique source is the first user and the second unique source is the second user.

The filter module 204 determines a portion of the social activity information associated with a unique source to be displayed on the client 120, and allocates 610 a portion of the display space to display the portion of the social activity information associated with the unique source. For example, the filter module 204 determines a first portion of the social activity information associated with a first user input provided by a user is presented to a client 120 and allocates display space to display the first portion of the social activity information, while a second portion of the social activity information associated with a second user input provided by the same user is not presented to the client 120.

The filter module 204 determines 612 whether the display limitation is met. For example, the filter module 204 determines whether any portion of the display space is still available for display. If the display limitation is not met, the filter module 204 continues to allocate 610 a portion of the available display space to display a portion of the social activity information associated with another unique source. For example, the filter module 204 allocates space for one social activity for as many of the unique sources as can be accommodated. The portions of the social activity information selected to display on the client 120 with allocated display space are referred to as the filtered social activity information. When the display limitation is met, the filter module 204 sends the filtered social activity information to the presentation module 110 for presentation to a user.

In one embodiment, display space is allocated so that each unique user has space for one social activity by that user. For example, with reference to steps 610 and 612, assume there are four users (Alice, Brian, Claude and Dan). Alice, Claude and Dan each have five activities (for a total of fifteen activities among three uses). However, Brian alone has ten activities. So, that the total activities among four users is twenty-five activities (fifteen plus ten is twenty-five). However, the display only has space for ten activities. At step 610, the filter module 204 selects four activities, one from each of the unique users, so that Alice, Brian, Claude and Dan each are represented in the displayed activities by one activity apiece. At this point, there are twenty-one total activities left among the users that have not been allocated display space (twenty-five minus four is twenty-one), with Alice, Claude and Dan each having four activities apiece that have not been allocated display space and Brian having nine activities that have not been allocated display space. The method 600 now moves to step 612 where a determination is made regarding whether the display limitation is met. In this example, the display limitation is ten. Since four videos have been allocated space, space for six videos is remaining in the display limitation and the method moves back to step 610. At step 610, the filter module 204 again selects four activities, one from each of the unique users, so that Alice, Brian, Claude and Dan each are represented in the displayed activities by one activity apiece. At this point there are a total of seventeen activities left among the users that have not been allocated display space (twenty-one minus four is seventeen), with Alice, Claude and Dan each having three activities apiece that have not been allocated display space and Brian having eight activities that have not been allocated display space. The method 600 again moves to step 612 where a determination is made regarding whether the display limitation is met. Since eight videos have now been allocated space, space for two videos is remaining in the display limitation and the method moves back to step 610. At step 610, the filter module 204 selects two activities, one from two of the unique users (with the two remaining users not being allocated any display space for their remaining activities). The process of selecting which two of the four unique users is allocated space is any method known in the art. In one embodiment, the two users are selected using a random number generator. In another embodiment, the two users are selected based at least in part on the alphabetized order of their names with user names closer to the letter "A" or the letter "Z" being given preference. In yet another embodiment, the two users are selected based at least in part on the date that they created their account with the video hosting site 100 so that more senior users are given preference. At this point there are a total of fifteen activities left among the users that have not been allocated display space (seventeen minus two is fifteen). The method moves to step 612 where a determination is made that the display limitation is met. The method then moves to step 614.

The presentation module 110 generates 614 a graphic based at least in part on the filtered social activity information received from the filter module 204. In one embodiment, the graphic is configured to display the filtered social activity information to the client 120. The presentation module 110 sends 616 the graphic to the client 120 for presentation to a user. For example, the presentation module 110 sends the graphic to the web browser of the client 120 and the web browser presents the filtered social activity information to the user using the graphic.

Figure 7:
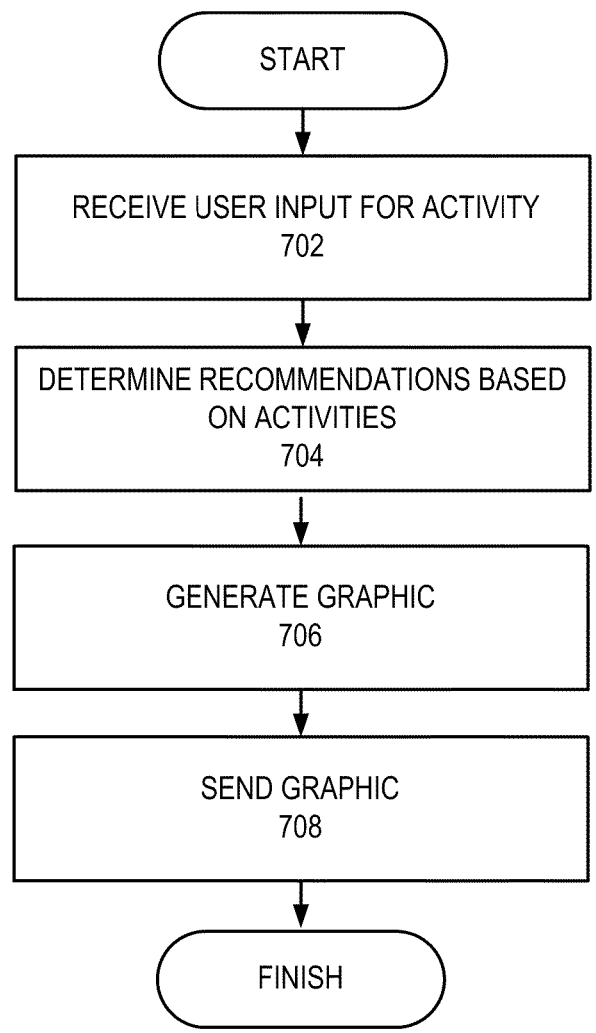
FIG. 7 is a flow diagram of a method for providing video recommendations to a user according to one embodiment.

FIG. 7 is a flow diagram 700 of a method for providing video recommendations to a first user according to one embodiment. The recommendation module 206 receives 702 one or more user inputs for one or more activities. The one or more user inputs are associated with one or more videos related to the one or more activities. In one embodiment, the one or more activities are one or more activities from the social feed retrieved from the feed database 126. In another embodiment, the one or more activities are one or more activities monitored by the activity monitor module 210. The recommendation module 206 determines 704 video recommendations based at least in part on the one or more activities.

The presentation module 110 generates 706 a graphic based at least in part on the video recommendations received from the recommendation module 206. In one embodiment, the graphic is configured to display the video recommendations to the client 120. The presentation module 110 sends 708 the graphic to the client 120 for presentation to the first user. In one embodiment, the presentation module 110 sends the graphic to the web browser of the client 120 and the web browser presents the video recommendations to the first user using the graphic. For example, the web browser presents a list of recommended videos to the first user including video titles, video thumbnails, descriptions, publishers of the videos and ratings, etc.

Figure 8:
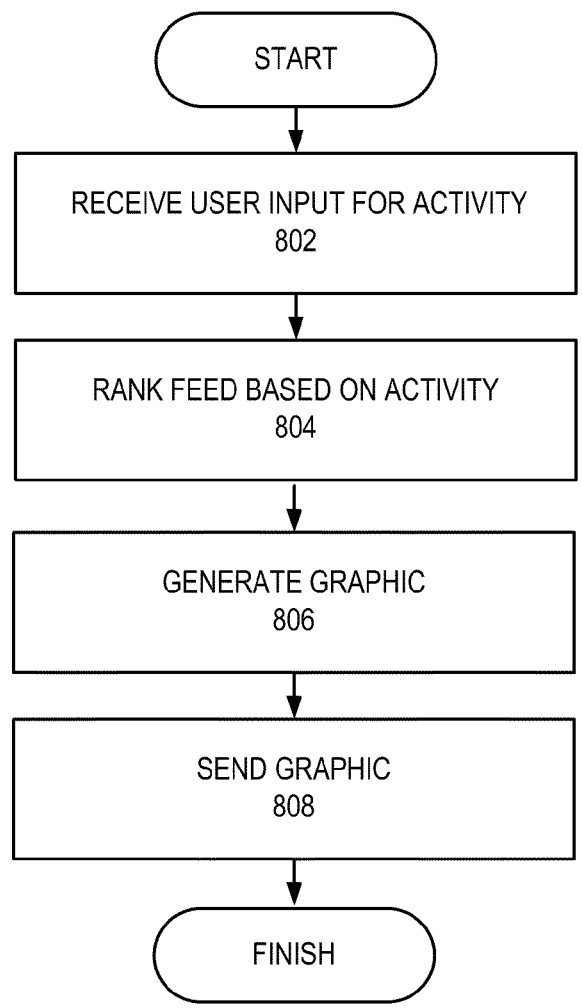
FIG. 8 is a flow diagram of a method for ranking a social feed according to one embodiment.

FIG. 8 is a flow diagram 800 of a method for ranking the social feed according to one embodiment. The feed ranking module 208 receives 802 one or more user inputs for one or more activities comprised within the social feed. In one embodiment, the social feed is retrieved from the feed database 126. The feed ranking module 208 ranks 804 the social feed based at least in part on the one or more user inputs for the one or more activities and forms a ranked feed as an output. The feed ranking module 208 sends the ranked feed to the presentation module 110.

For example, the feed ranking module 208 ranks the social feed based at least in part on one or more scores of the one or more activities. The one or more activities are associated with one or more videos published by one or more publishers. The feed ranking module 208 calculates a score for each activity. The score for an activity associated with a video published by a publisher is determined based at least in part on one or more of: a video view count; a video sharing count; a favorite count; user ratings of the video; a liked count; a disliked count; a comment count; age of the video; a video tag; whether the video is a popular video; whether the video is a featured video; the publisher's total video views on the video hosting site 100; the publisher's video count; the publisher's subscriber/friend count; the publisher's account age; and ratios between any two of the above items. The feed ranking module 208 forms a ranked feed so that a first activity with a higher score is listed before a second activity with a lower score in the ranked feed.

The presentation module 110 generates 806 a graphic based at least in part on the ranked feed received from the feed ranking module 208. In one embodiment, the graphic is configured to display the ranked feed to the client 120. The presentation module 110 sends 808 the graphic to the client 120 for presentation to a user. For example, the presentation module 110 sends the graphic to the web browser of the client 120 and the web browser presents the ranked feed to the user using the graphic.

In one embodiment, the system 105 makes the homepage of a website generated by the video hosting site 100 the first place people turn to answer the question "what should I watch today?" In other words, create a homepage with a great set of personalized video recommendations and a consumption experience that compels users to visit multiple times per day. In contrast to many social sites, one embodiment allows information in the feed based on activity on other sites. For example, a user of the client 120 accesses the homepage and sees information about activities of his/her friends as they watch embedded videos on other sites such as the third-party site 128 (assuming the friends have agreed to this, of course). Moreover, even if a user's friends are not active, it is possible for the user to ask to see "More" on his feed and his feed can be augmented with, for example, recommended videos and/or channels or, for example, additional activity of his friends from longer ago (with their permission, of course) or, for example, from friends of friends (with their permission). Alternative embodiments need not require permission, or may leave permission requirements up to users.

In various embodiments, privacy concerns are taken into account when determining what to put in a user's feed.

In one embodiment, the system 105 takes into account some, all or none or the following types of data, assuming that this type of data is kept for that embodiment and assuming user privacy concerns have been addressed and taken into account: subscriptions; recommended for you; recent activity from friends & subscriptions on the video hosting site 100; previously favorited or watched videos on the video hosting site 100; third-party site 128 video activity from friends; Google Buzz™ or similar social commentary sites; videos embedded on third-party sites 128 the user likes; videos sent to the user via email; videos featured on the video hosting site 100 and/or the third-party site 128; spotlight videos on the video hosting site 100; most popular videos on the video hosting site 100 and/or the third-party site 128; videos being watched now on the video hosting site 100 and/or the third-party site 128; videos and/or news having a geographical relevance to the human user of a client device 120; group activity; and playlist activity.

In one embodiment, features provided by the system 105 include the following: persistent videos in the video feed; "show me more" generation of new feed items; encourage new channel subscription(s) and/or bundles of same or similar videos from the feed; let me delete/remove anything from my feed; permanent filters (e.g., no ratings, no favorites of fred, etc); low latency pulls from other social network sites; suggest that logged out users log in for better videos; mark videos as watched once you've seen it; add persistent stars to favorite videos; inline comments/conversations on feed items; the user of the client 120 can set priority for which items go in feed; pull videos from social network sites; count of videos presented; play all control to allow the user of the client 120 to play all videos in his/her current feed; say "fewer like this" so that fewer videos similar to the one currently being played are suggested to the user of the client 120; carry the feed over to watch when the user of the client 120 clicks on any video in the feed; tell me when subscribed videos have been collapsed (e.g., click here to see eight other videos from a second user"); temporary view filters (only a certain type, only from a certain source, etc.); let me pin a video on my homepage until I explicitly unpin it; one click post to third-party social networking site 128 (including one click like or favoriting of a video to the third-party site from a web page hosted by the video hosting site 100); collapsing the same action on the same video by the same person (dedupe across multiple services, e.g., a favorite on the video hosting site 100 becomes an autoshare on the third-party site 128); take my feed offsite.

Figure 9:
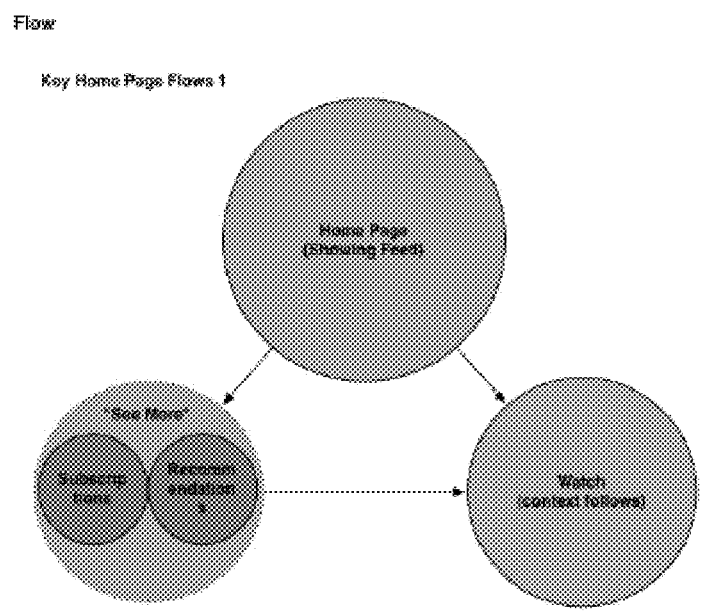
FIG. 9 depicts a system for organizing social information on a website according to one embodiment.
Figure 10:
FIGS. 10 through 26 depict screenshots of graphical user interfaces generated by a video hosting site according to one or more embodiments.
Figure 11:
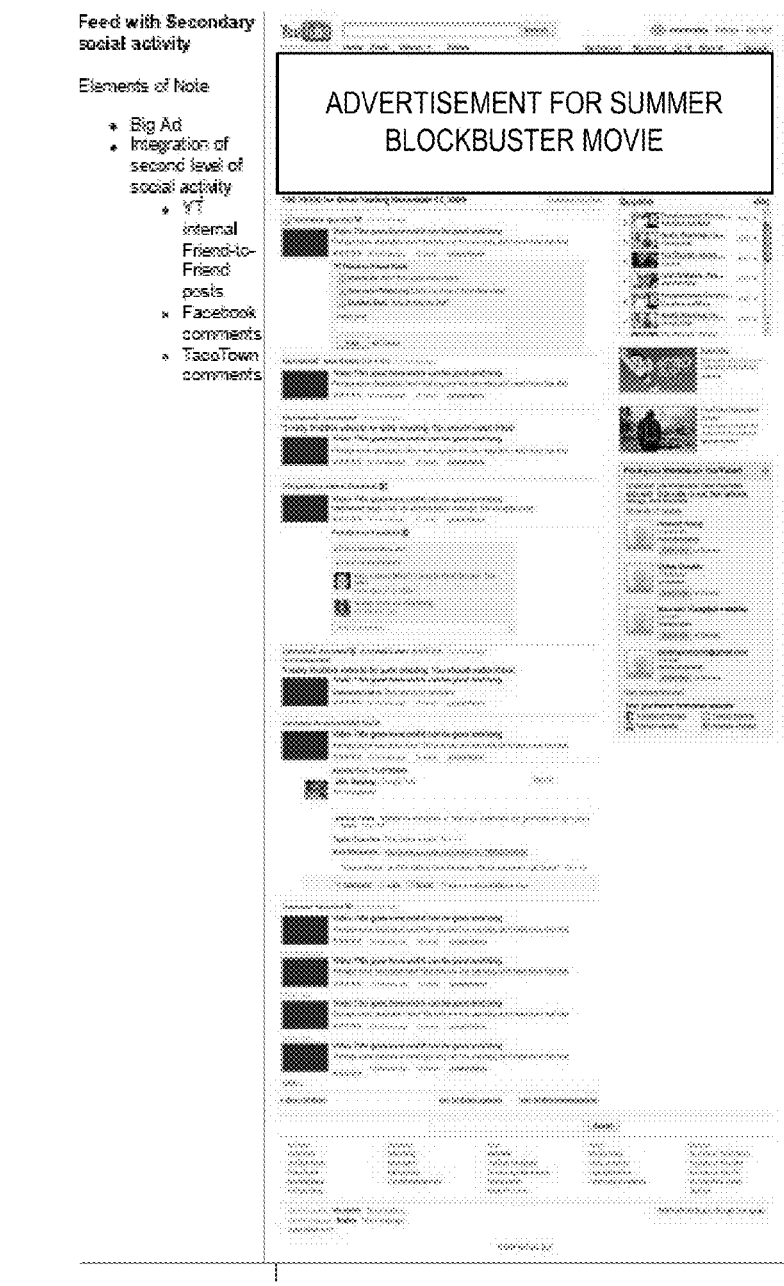
Figure 12:
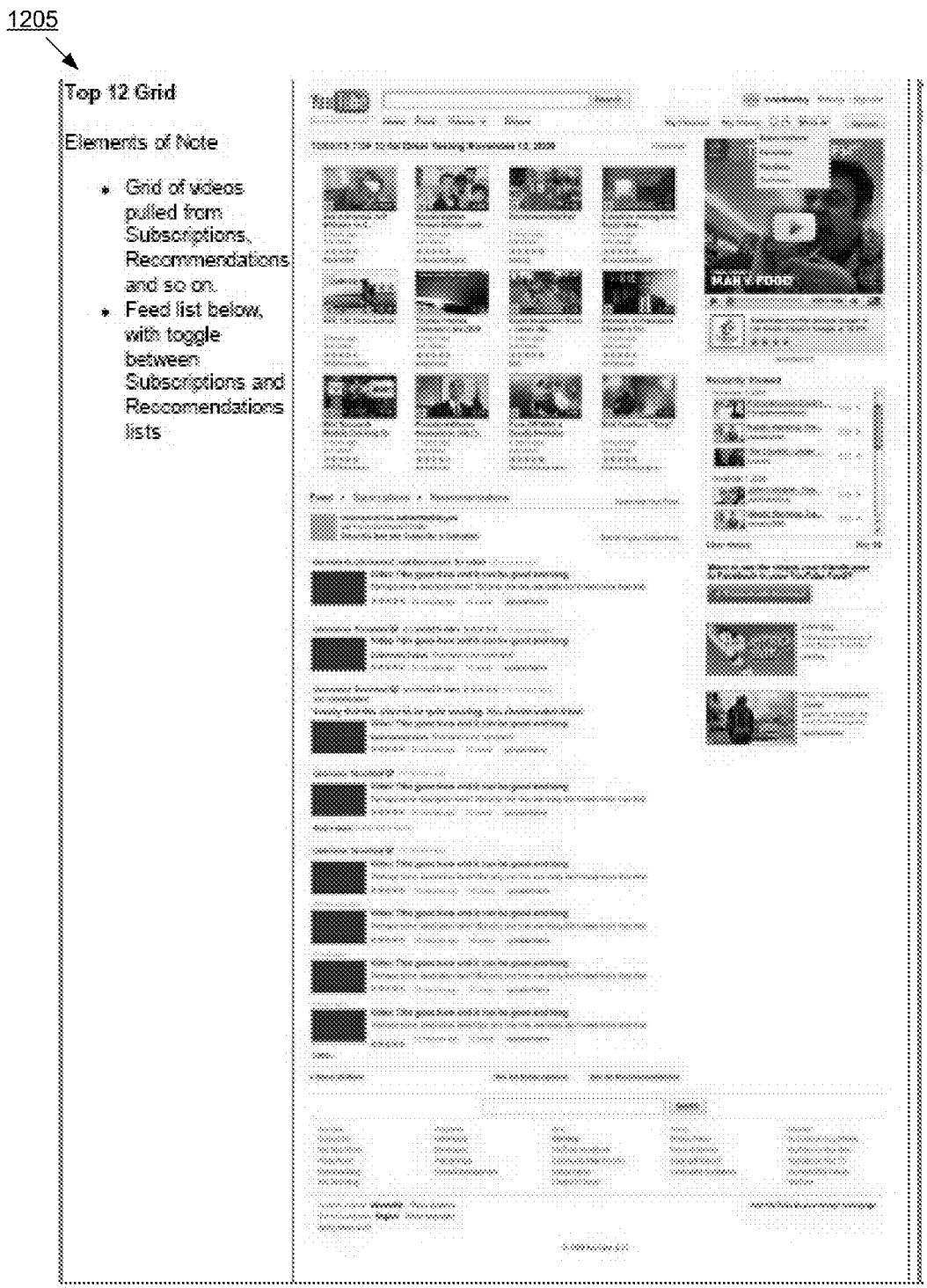
Figure 13:
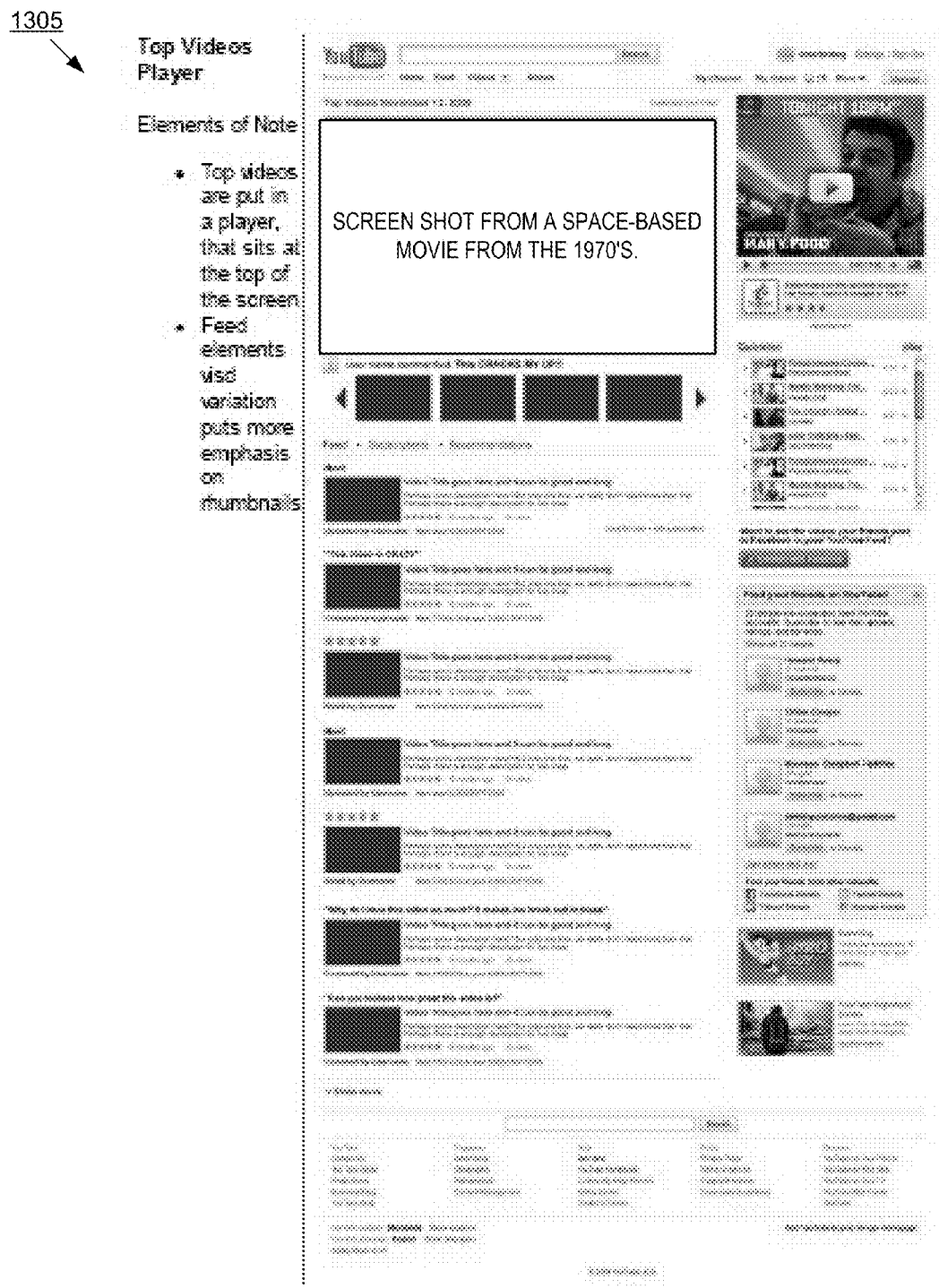
Figure 14:
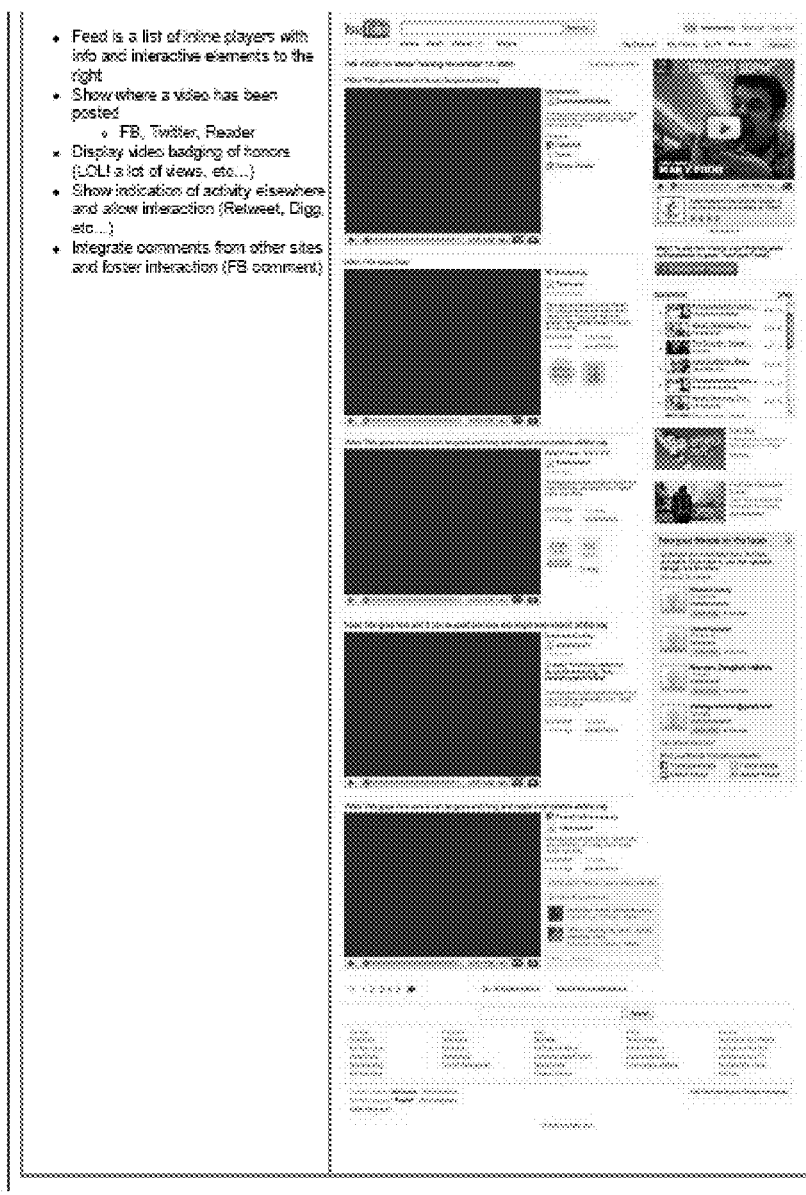
Figure 15:
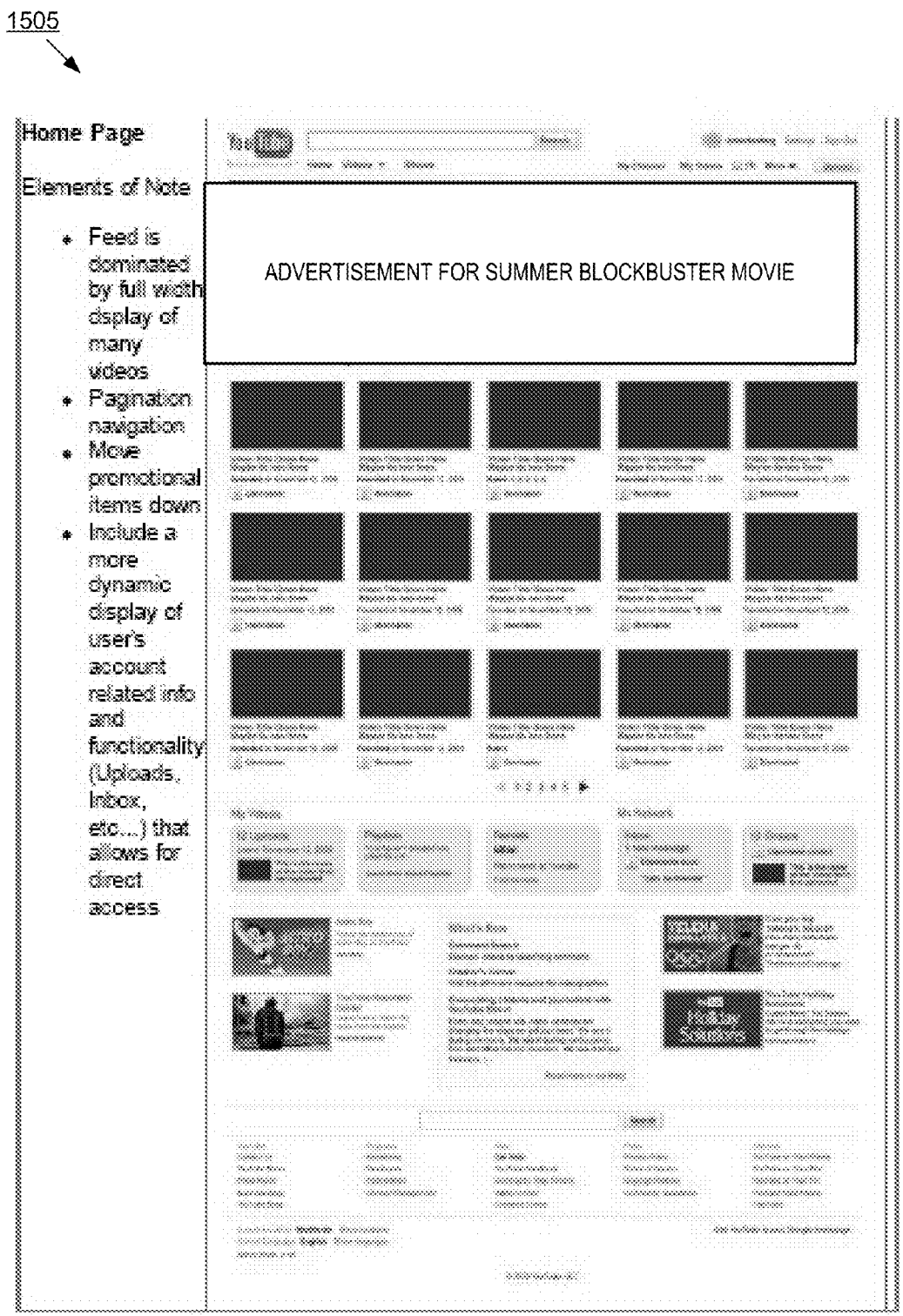
Figure 16:
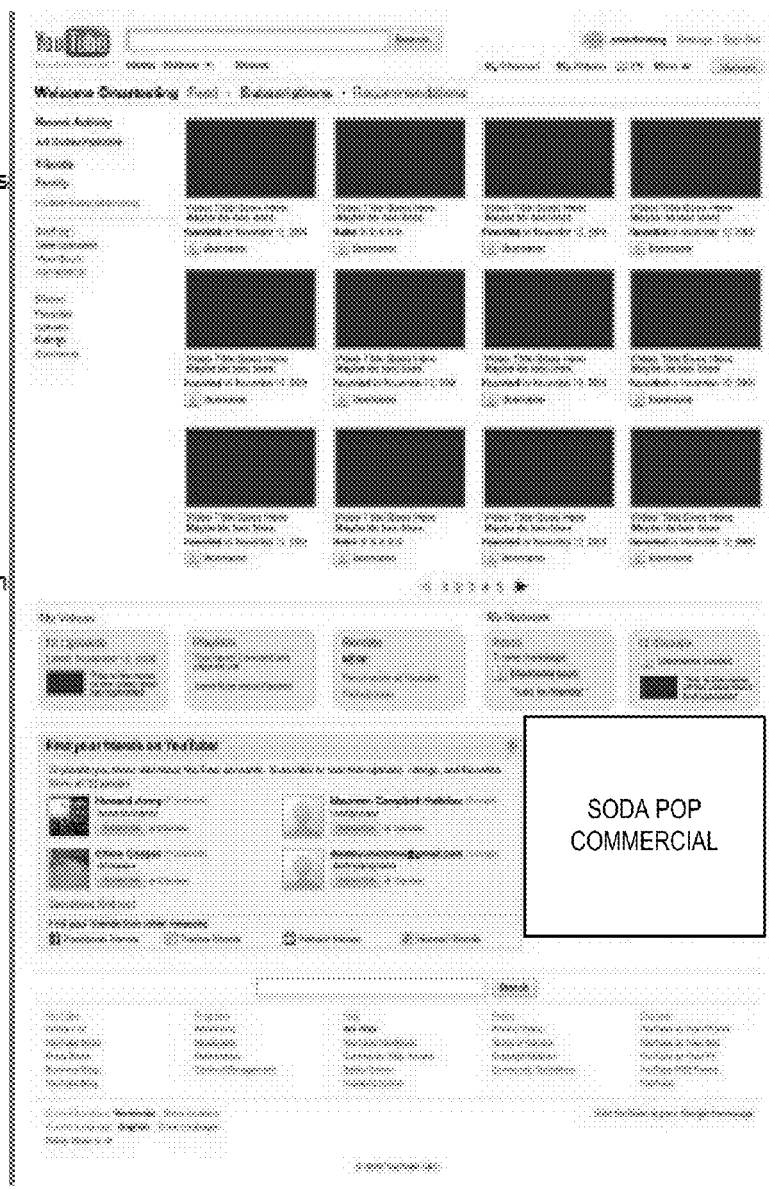
Figure 17:
Figure 18:
Figure 19:
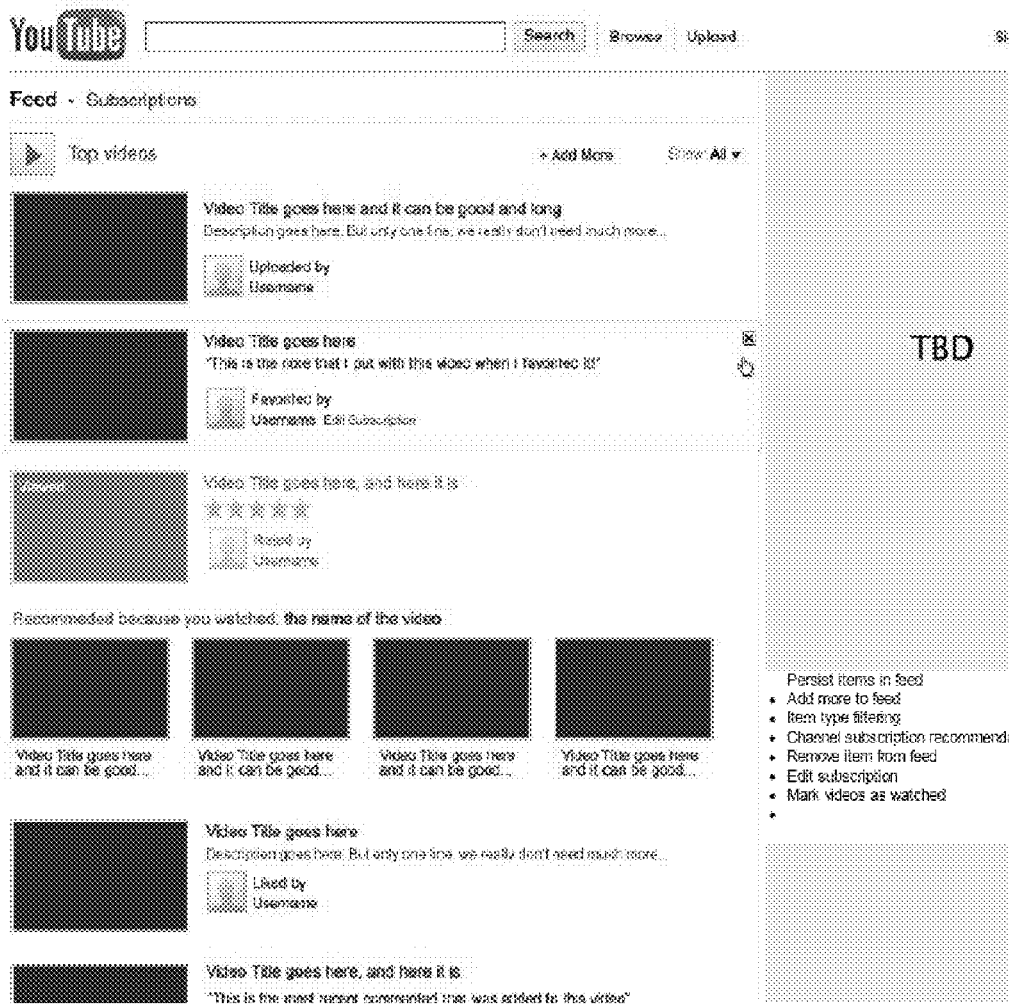
Figure 20:
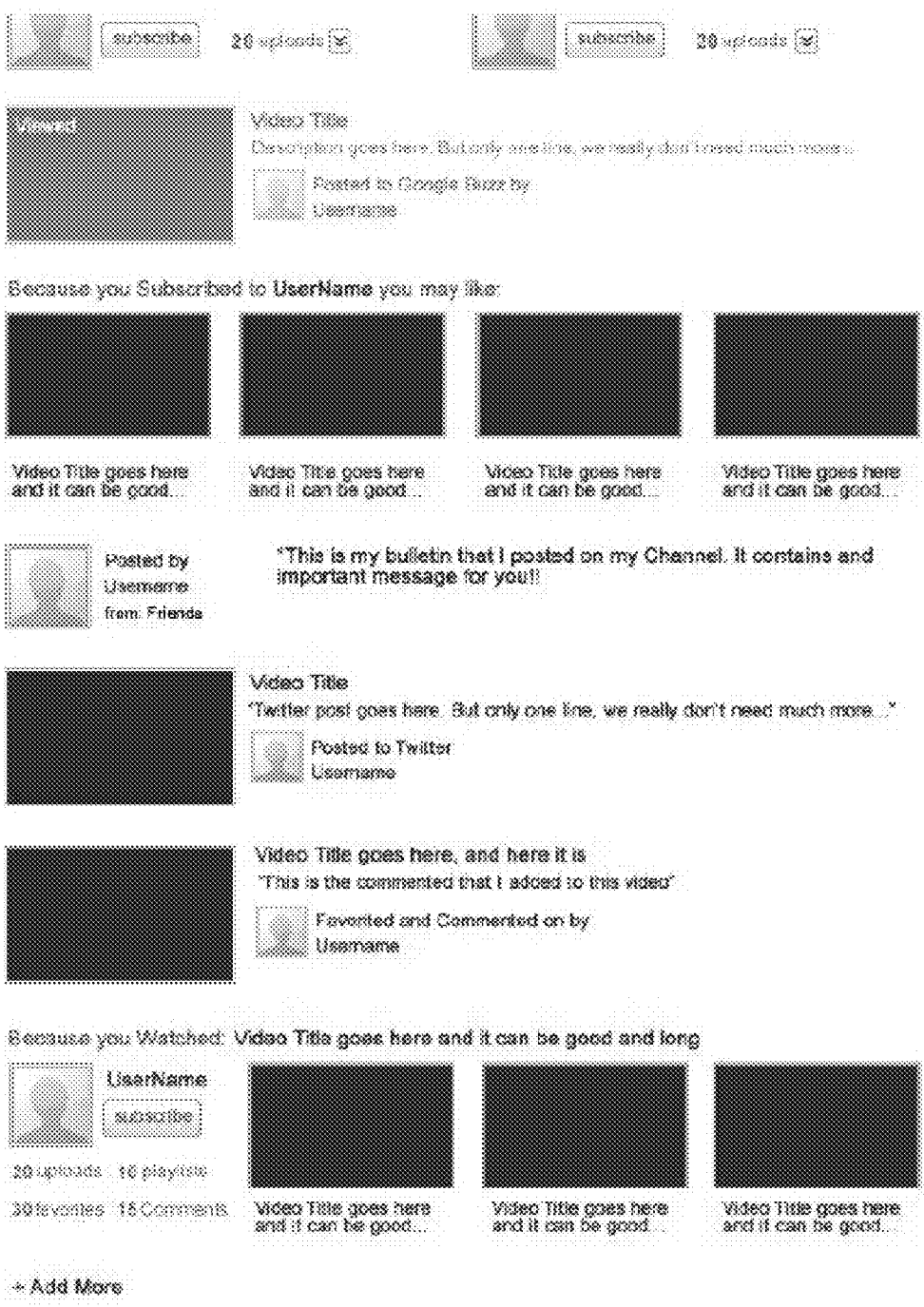
Figure 21:
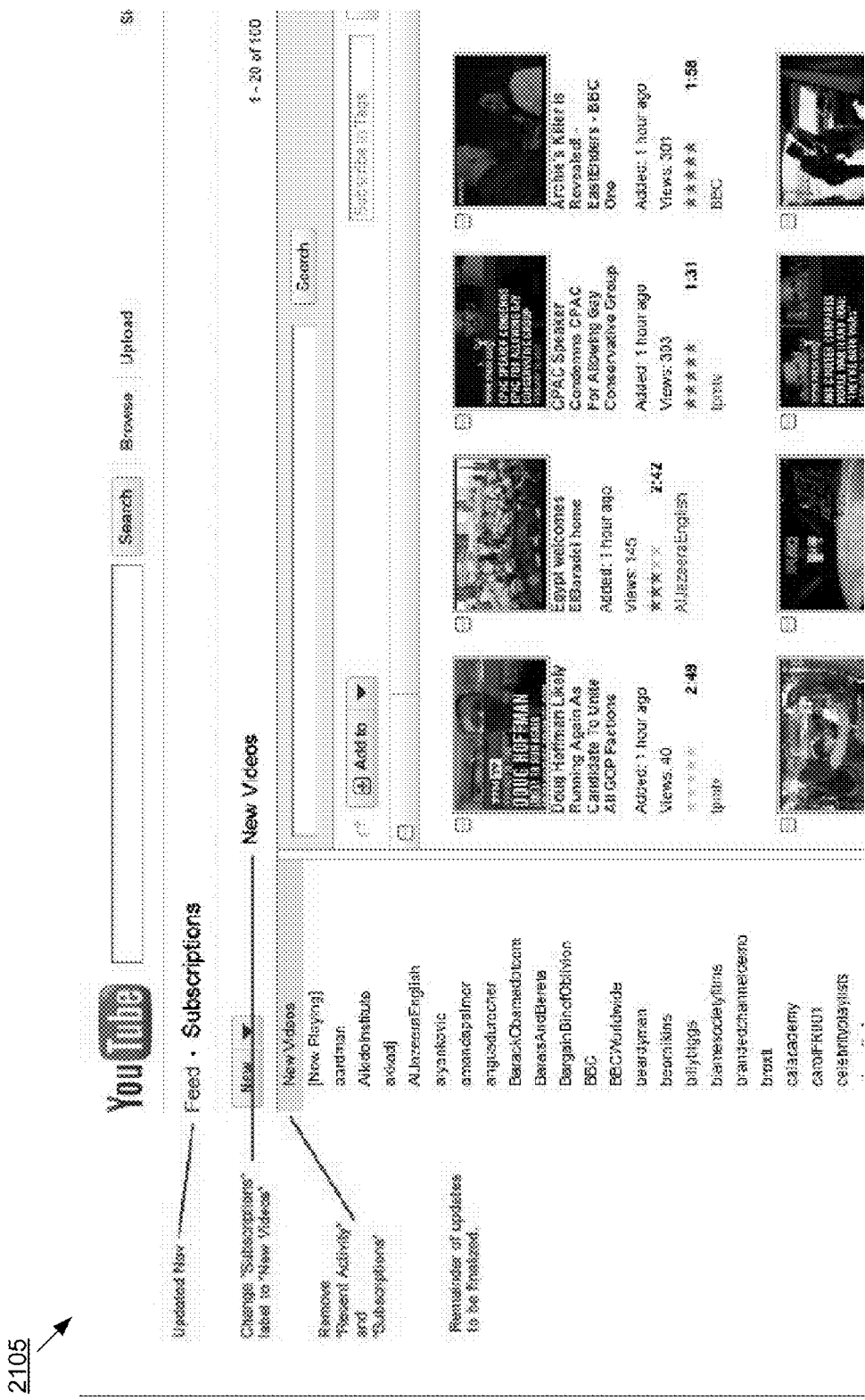
Figure 22:
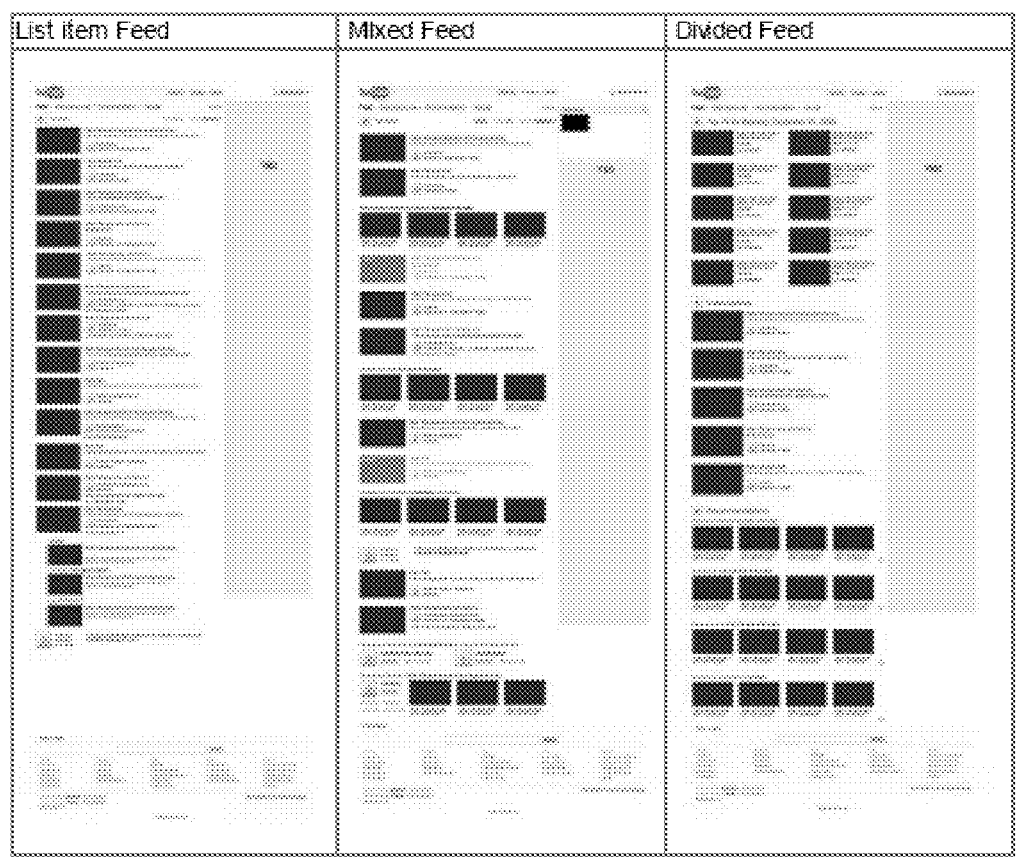
Figure 23:
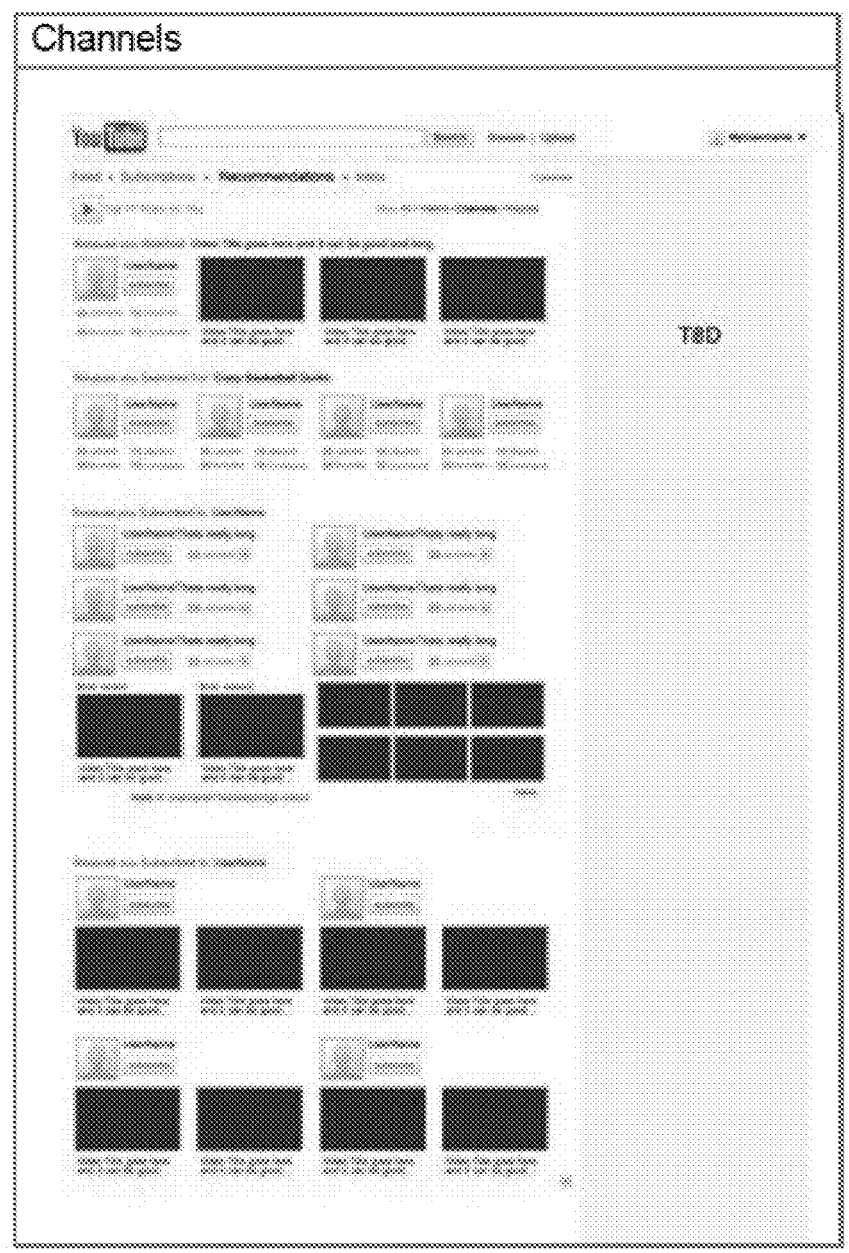
Figure 24:
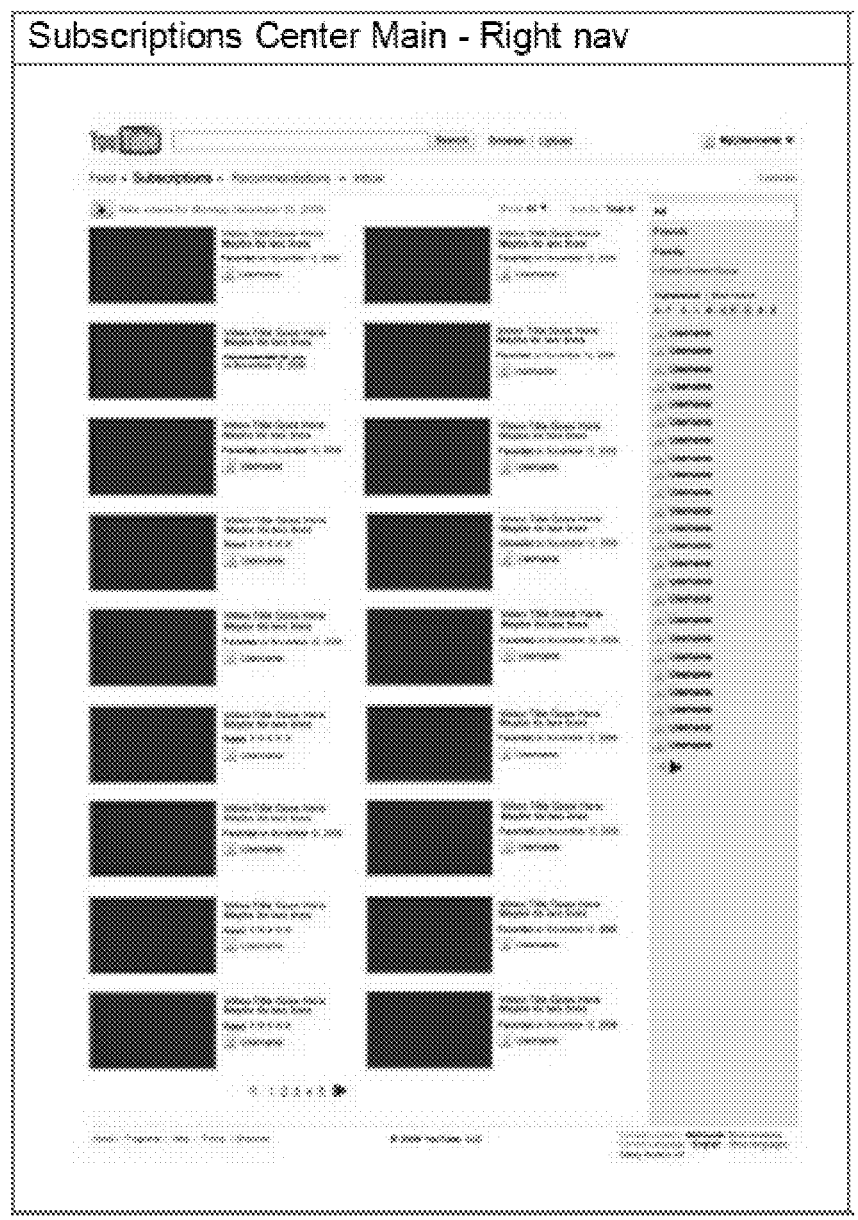
Figure 25:
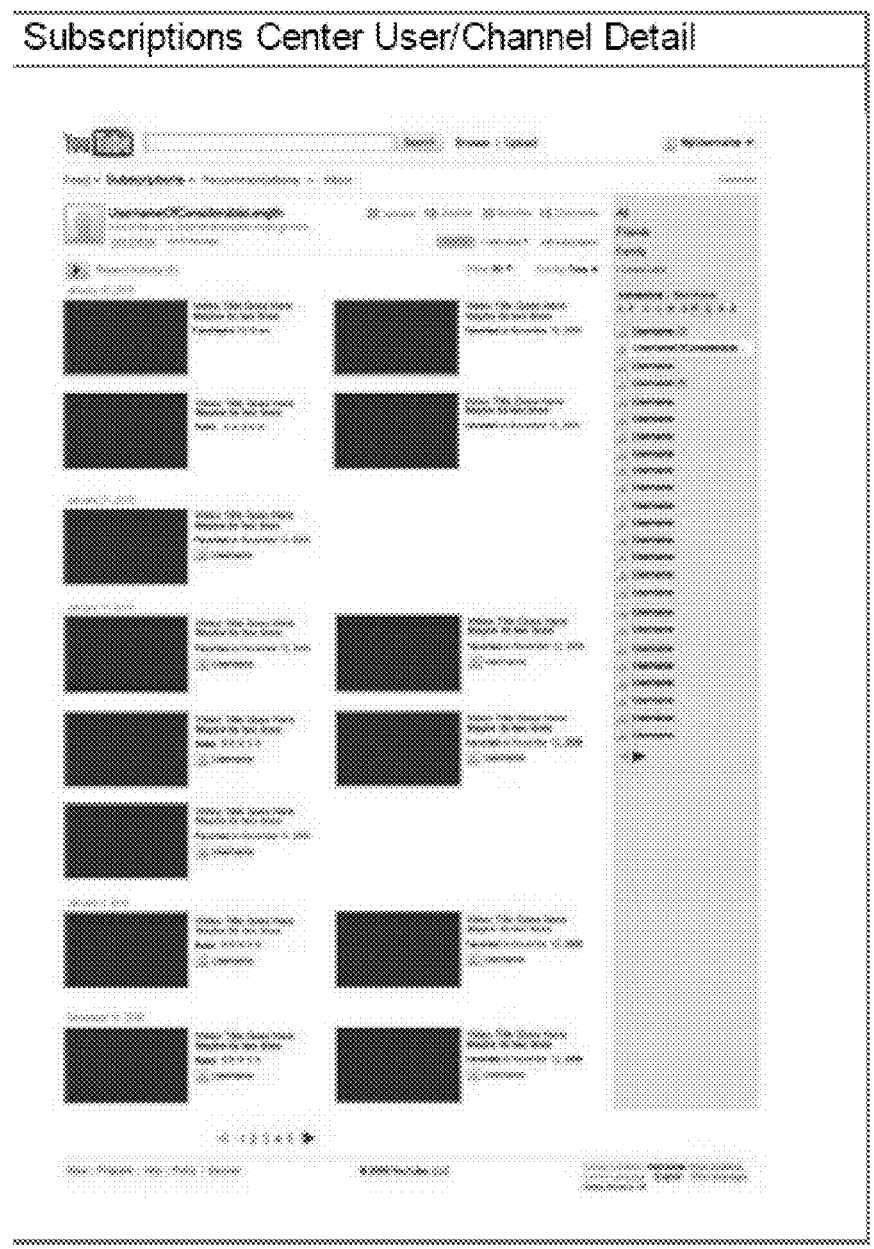
Figure 26:
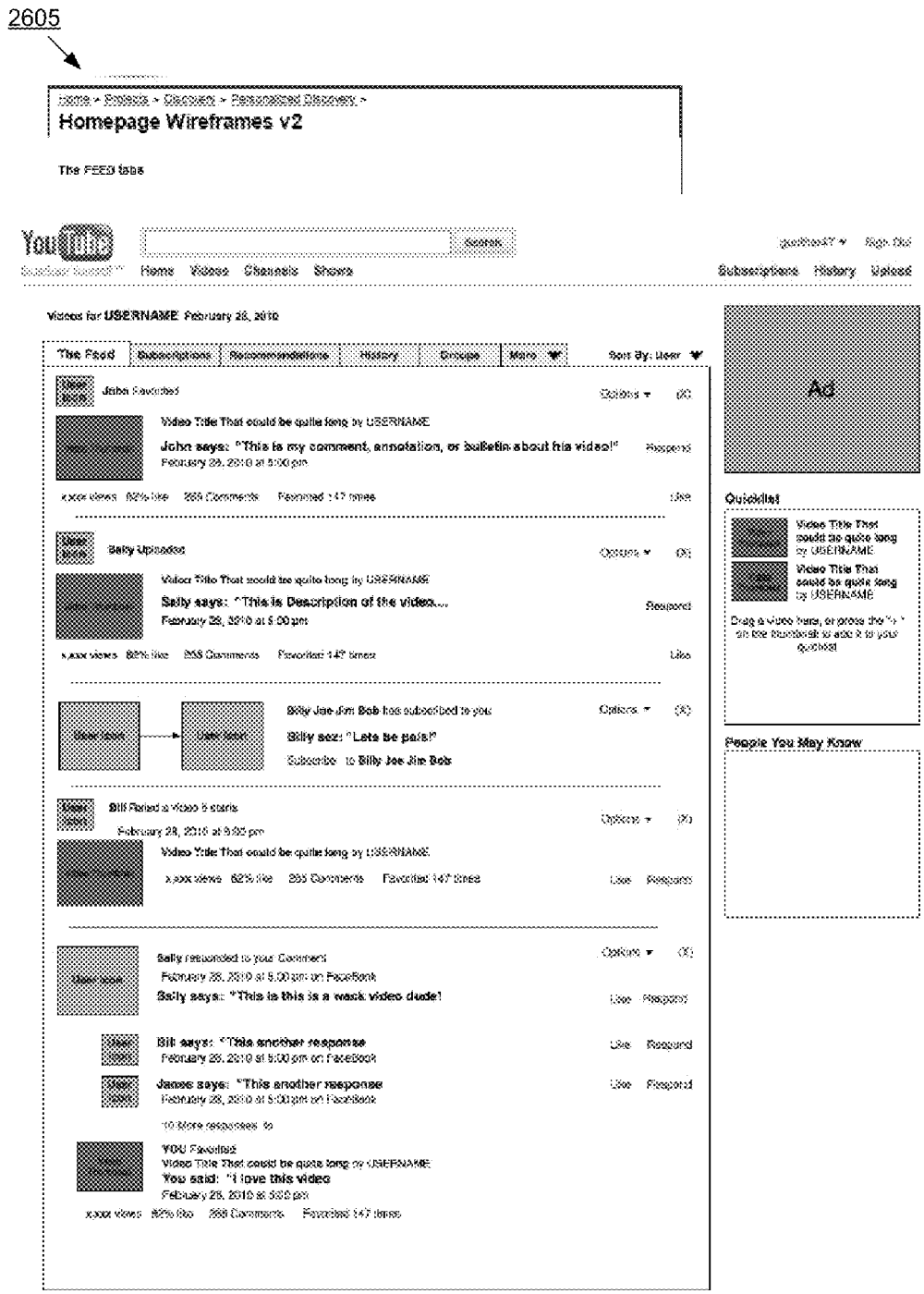
Figure 27:
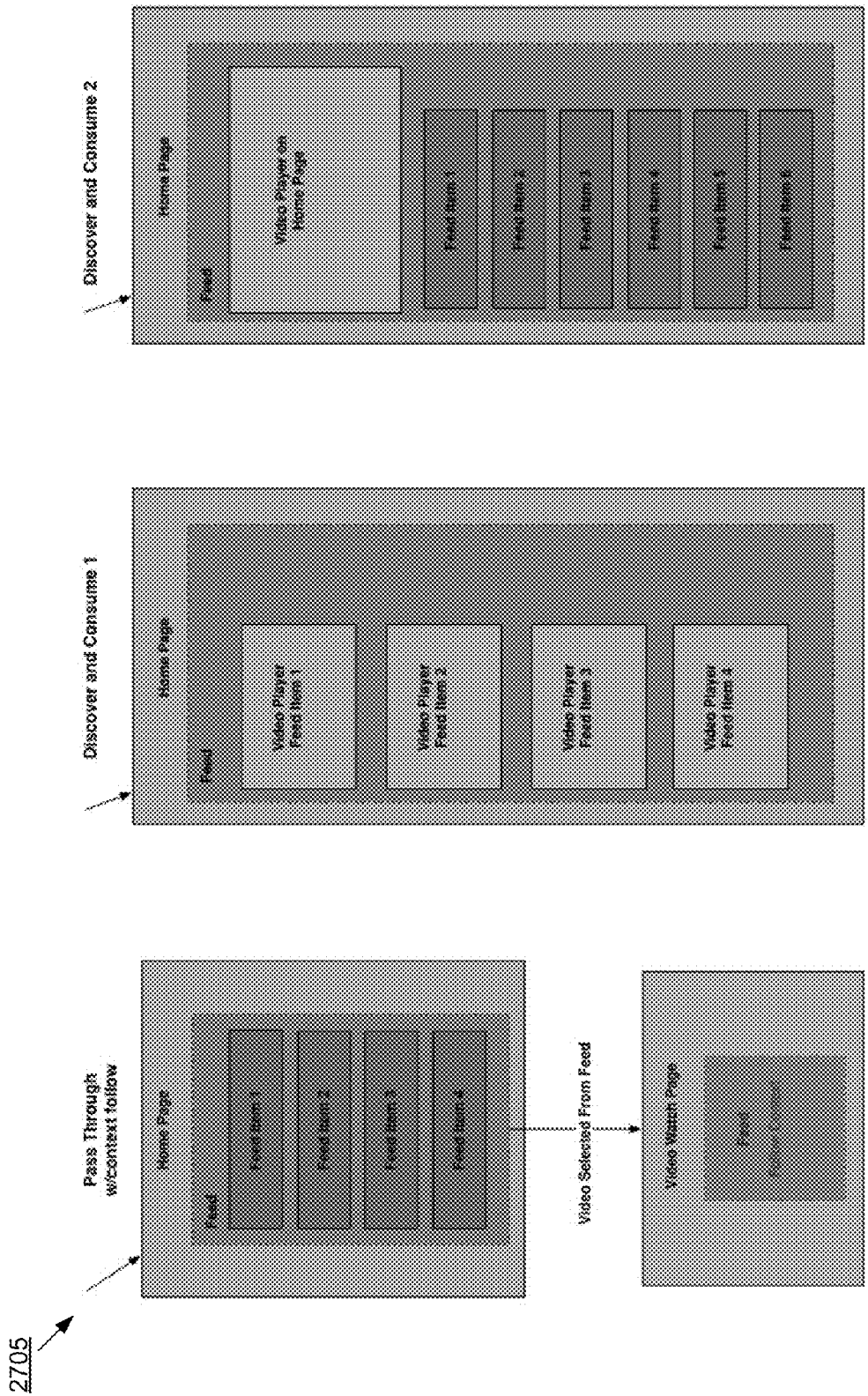
FIG. 27 depicts a system for organizing social information on a website according to one embodiment.
Figure 28:
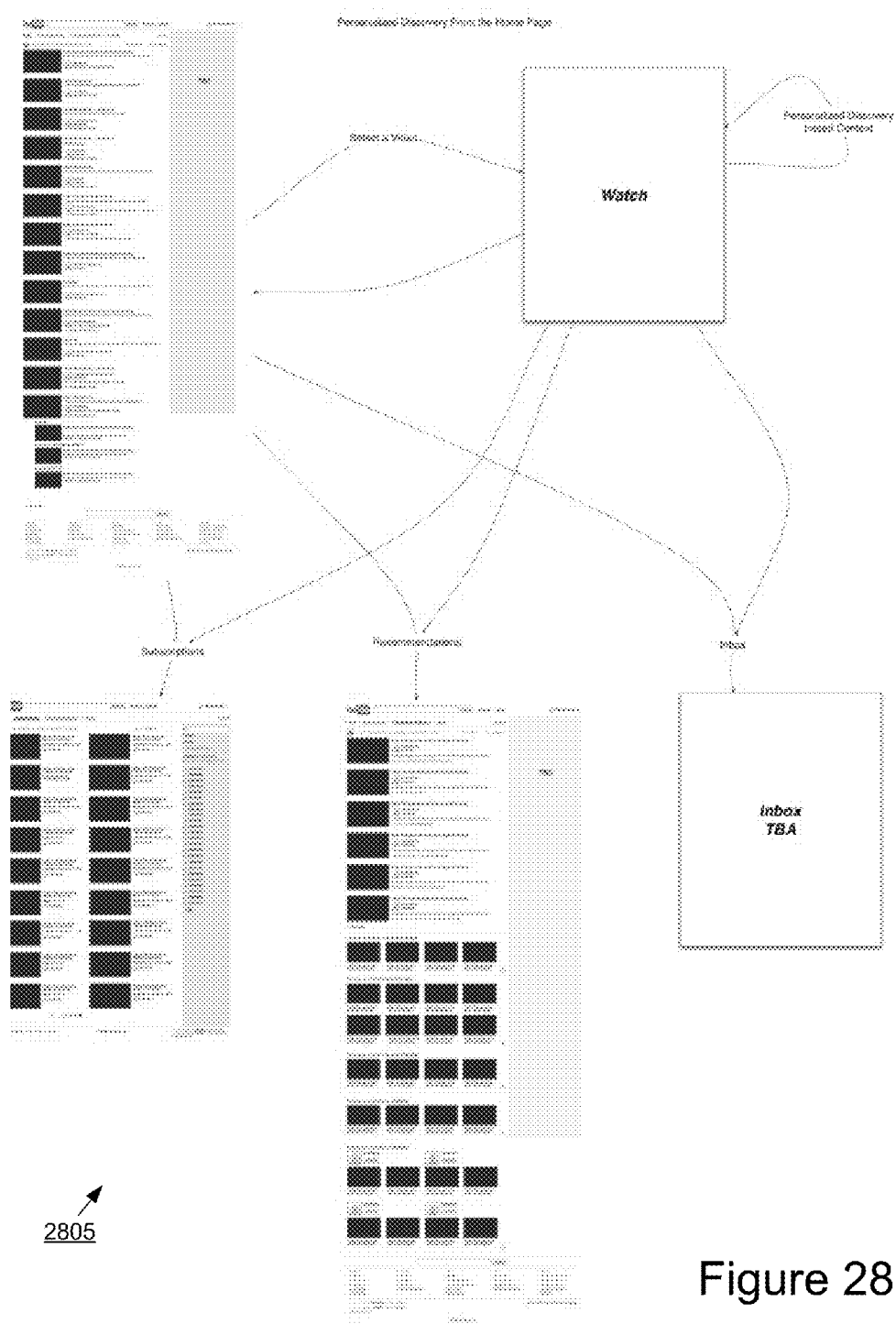
FIG. 28 depicts a system for organizing social information on a website according to one embodiment.

FIG. 9 depicts a system 905 for organizing social information on a video site (e.g. video hosting site 100) according to one embodiment. FIGS. 10 through 26 depict screenshots of graphical user interfaces 1005, 1105, 1205, 1305, 1405, 1505, 1605, 1705, 1805, 1905, 2005, 2105, 2205, 2305, 2405, 2505, 2605 generated by the video hosting site 100 according to one or more embodiments of the present invention. FIG. 27 depicts a system 2705 for organizing social information on a video site (e.g. video hosting site 100) according to one embodiment. FIG. 28 depicts a system 2805 for organizing social information on a video site (e.g. video hosting site 100) according to one embodiment.

Figure 29:
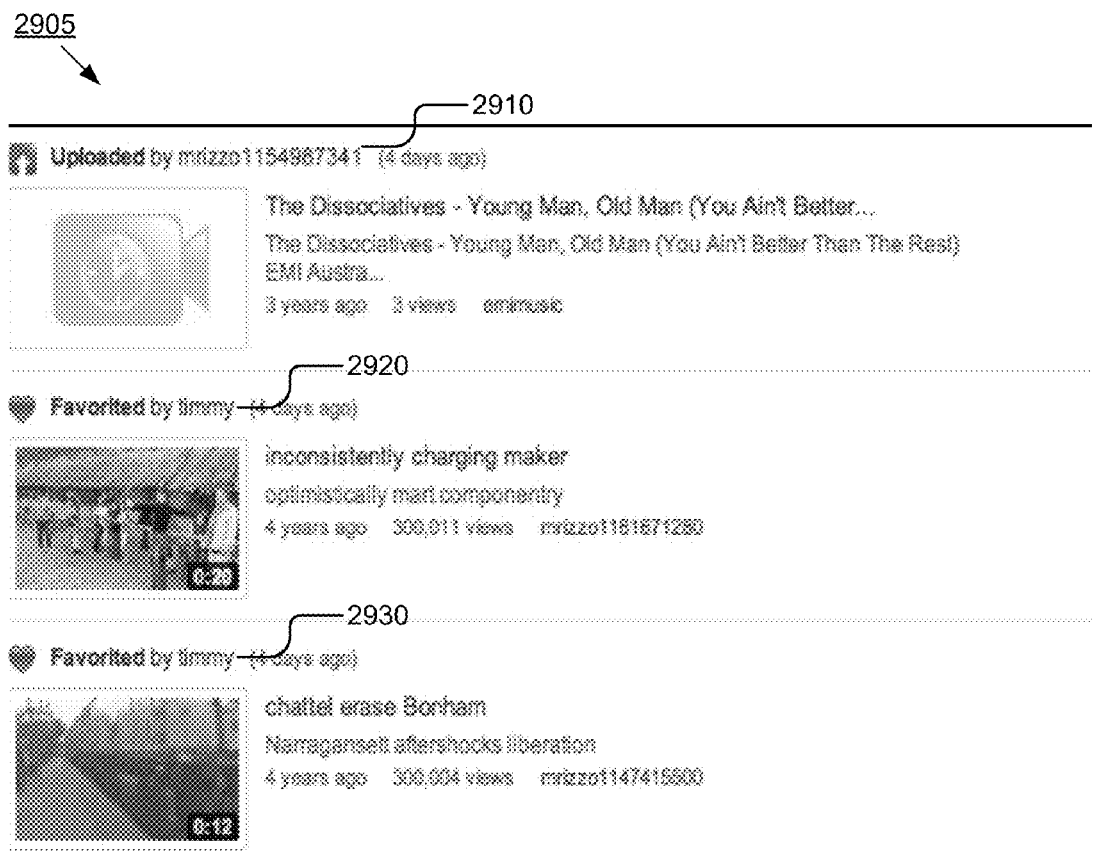
FIGS. 29 and 30 depict screenshots of graphical user interfaces generated by a video hosting site according to one or more embodiment.
Figure 30:
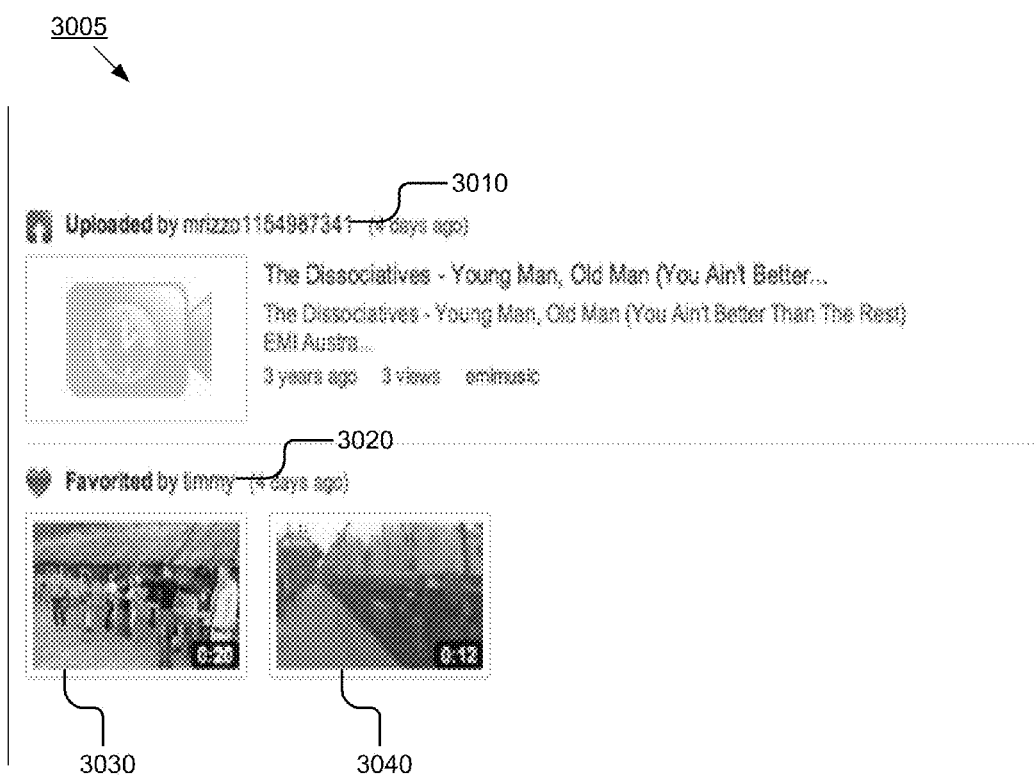

FIGS. 29 and 30 depict screenshots of graphical user interfaces 2905, 3005 generated by a video hosting site 100 according to one or more embodiment. Specifically, FIG. 29 depicts a first graphical user interface 2905. The first graphical user interface 2905 depicts an example of a non-aggregated feed. The non-aggregated feed shows three social activities by two different users, "timmy" and "mrizzo1154987341." Element 2910 depicts an activity by "mrizzo1154987341." Elements 2920 and 2930 depict activities by "timmy."

FIG. 30 depicts a second graphical user interface 3005. The second graphical user interface 3005 depicts an example of an aggregated feed. Specifically, the second graphical user interface 3005 depicts an example of how the non-aggregated feed depicted in the first graphical user interface 2905 would look if the non-aggregated feed were aggregated. Like the non-aggregated feed of FIG. 29, the aggregated feed shows three social activities by two different users, "timmy" and "mrizzo1154987341." Element 3010 depicts an activity by "mrizzo1154987341." Element 3010 corresponds to element 2910 in FIG. 29. Element 3020 depicts two activities by "timmy." Specifically, element 3020 depicts an aggregated version of the activities represented by elements 2920 and 2930 in FIG. 29. For example, the graphic 3030 in FIG. 30 corresponds to element 2920 in FIG. 29 and the graphic 3040 in FIG. 30 corresponds to element 2930 in FIG. 29. Thus, FIG. 30 depicts an aggregated version of the non-aggregated feed depicted in FIG. 29. Those having ordinary skill in the art will recognize that there are other ways of depicting an aggregated version of the non-aggregated feed depicted in FIG. 29.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method comprising:
    receiving, at one or more computers, one or more user inputs associated with social activity information describing one or more actions taken, the one or more user inputs having a common user and a common video;
    determining, at the one or more computers, the common video and the common user for the one or more user inputs;
    determining, at the one or more computers, one or more classifications for the social activity information;
    associating, at the one or more computers, the one or more user inputs with the one or more classifications; and
    aggregating, at the one or more computers, the social activity information based at least in part on a hierarchy of importance for the one or more classifications, the hierarchy of importance indicating a relative importance for each of the one or more classifications.

2. The method of claim 1, wherein each of the one or more classifications is a description of one of the one or more actions taken on a website, the website comprising a computer system adapted to serve content using an internet working protocol.

3. The method of claim 2, wherein the website is a social networking site.

4. The method of claim 2, wherein the website is a video hosting site.

5. The method of claim 2, wherein the website is an online bulletin board.

6. The method of claim 2, wherein the website is a video hosting site integrated with social networking features.

7. The method of claim 1, further comprising generating a graphic associated with the aggregated social activity information and sending the graphic to a client.

8. A system comprising at least one processor and a non-transitory storage medium, and configured to provide:
    a front end interface configured to receive one or more user inputs associated with social activity information describing one or more actions, the one or more user inputs having a common user and a common video;
    a feed serving module communicatively coupled to the front end interface to receive the one or more user inputs, the feed serving module configured to determine the common video and the common user for the one or more user inputs, determine one or more classifications for the social activity information, associate the one or more user inputs with the one or more classifications and aggregate the social activity information based at least in part on a hierarchy of importance for the one or more classifications, the hierarchy of importance indicating a relative importance for each of the one or more classifications.

9. The system of claim 8, wherein each of the one or more classifications is a description of one of the one or more actions taken on a website, the website comprising a computer system adapted to serve against content using an internet working protocol.

10. The system of claim 9, wherein the website is a social networking site.

11. The system of claim 9, wherein the website is a video hosting site.

12. The system of claim 9, wherein the website is an online bulletin board.

13. The system of claim 9, wherein the website is a video hosting site integrated with social networking features.

14. The system of claim 8, further comprising a presentation module communicatively coupled to the feed serving module and the front end interface, the presentation module configured to generate a graphic associated with the aggregated social activity information and send the graphic to the front end interface, wherein the front end interface is configured to send the graphic to a client.

15. A computer program product comprising a computer usable medium including a computer readable program, wherein the computer readable program when executed on a computer causes the computer to perform steps comprising:
- receiving one or more user inputs associated with social activity information describing one or more actions, the one or more user inputs having a common user and a common video;
- determining the common video and the common user for the one or more user inputs;
- determining one or more classifications for the social activity information;
- associating the one or more user inputs with the one or more classifications; and
- aggregating the social activity information based at least in part on a hierarchy of importance for the one or more classifications, the hierarchy of importance indicating a relative importance for each of the one or more classifications.

16. The computer program product of claim 15, wherein each of the one or more classifications is a description of one of the one or more actions taken on a website, the website comprising a computer system adapted to serve content using an internet working protocol.

17. The computer program product of claim 16, wherein the website is a social networking site.

18. The computer program product of claim 16, wherein the website is a video hosting site.

19. The computer program product of claim 16, wherein the website is an online bulletin board.

20. The computer program product of claim 16, wherein the website is a video hosting site integrated with social networking features.

21. The computer program product of claim 15, wherein the computer readable program, when executed on the computer causes the computer to perform further steps comprising generating a graphic associated with the aggregated social activity information and sending the graphic to a client.

* * * * *